United States Patent
Rullán Lind et al.

(10) Patent No.: US 12,534,746 B2
(45) Date of Patent: Jan. 27, 2026

(54) ARTIFICIAL FUSION OF DEHYDRATASE ENZYMES TO IMPROVE PRODUCTION OF FATTY ACIDS

(71) Applicant: University of Puerto Rico, San Juan, PR (US)

(72) Inventors: Carlos Ralph Rullán Lind, San Juan, PR (US); Abel Juan Baerga Ortiz, San Juan, PR (US)

(73) Assignee: University of Puerto Rico, San Juan, PR (US)

( * ) Notice: Subject to any disclaimer, the term of this patent is extended or adjusted under 35 U.S.C. 154(b) by 730 days.

(21) Appl. No.: 17/435,709

(22) PCT Filed: Mar. 5, 2020

(86) PCT No.: PCT/US2020/021077
§ 371 (c)(1),
(2) Date: Sep. 2, 2021

(87) PCT Pub. No.: WO2020/185485
PCT Pub. Date: Sep. 17, 2020

(65) Prior Publication Data
US 2022/0403424 A1 Dec. 22, 2022

Related U.S. Application Data

(60) Provisional application No. 62/815,676, filed on Mar. 8, 2019.

(51) Int. Cl.
*C12P 7/6409* (2022.01)
*C12N 9/88* (2006.01)

(52) U.S. Cl.
CPC .............. *C12P 7/6409* (2013.01); *C12N 9/88* (2013.01); *C12Y 402/01059* (2013.01)

(58) Field of Classification Search
CPC .. C12P 7/6409; C12N 9/88; C12Y 402/01059
See application file for complete search history.

(56) References Cited

U.S. PATENT DOCUMENTS

| | | |
|---|---|---|
| 2002/0119520 A1 | 8/2002 | Konstantinidis et al. |
| 2013/0177989 A1 | 7/2013 | Baerga-Ortiz et al. |

OTHER PUBLICATIONS

"SEQ ID No. 15 pfaA Alignment," downloaded Nov. 22, 2024 (Year: 2018).*
PCT International Search Report and Written Opinion, Application No. PCT/US2020/021077, mailed Jul. 16, 2020, 16 pages.
Rullan-Lind, Carlos, Ruth B. Pietri, Melvin Vazquez-Cintron, and Abel Baerga-Ortiz. "Fused dimerization increases expression, solubility, and activity of bacterial dehydratase enzymes." Protein Science 27, No. 5 (2018): 969-975.
Heath, Richard J., and Charles O. Rock. "Roles of the FabA and FabZ B-hydroxyacyl-acyl carrier protein dehydratases in *Escherichia coli* fatty acid biosynthesis." Journal of Biological Chemistry 271, No. 44 (1996): 27795-27801.
Mohan, Sandhya, Theresa M. Kelly, Suzanne S. Eveland, C. R. Raetz, and Matt S. Anderson. "An *Escherichia coli* gene (FabZ) encoding (3R)-hydroxymyristoyl acyl carrier protein dehydrase. Relation to fabA and suppression of mutations in lipid A biosynthesis." Journal of Biological Chemistry 269, No. 52 (1994): 32896-32903.

* cited by examiner

*Primary Examiner* — Suzanne M Noakes
*Assistant Examiner* — Ciara A Mcknight
(74) *Attorney, Agent, or Firm* — McDonnell Bohnen Hulbert & Berghoff LLP

(57) ABSTRACT

The disclosure provides fused dimer constructs that enhance fatty acid production and methods for making the dimer constructs. The fused dimer comprises Fab A and/or FabZ enzymes.

18 Claims, 22 Drawing Sheets
Specification includes a Sequence Listing.

SEQUENCE LISTING

```
<160> NUMBER OF SEQ ID NOS: 17

<210> SEQ ID NO 1
<211> LENGTH: 372
<212> TYPE: PRT
<213> ORGANISM: Artificial Sequence
<220> FEATURE:
<223> OTHER INFORMATION: FabA-Linker-FabA

<400> SEQUENCE: 1

Met Val Asp Lys Arg Glu Ser Tyr Thr Lys Glu Asp Leu Leu Ala Ser
1               5                   10                  15

Gly Arg Gly Glu Leu Phe Gly Ala Lys Gly Pro Gln Leu Pro Ala Pro
            20                  25                  30

Asn Met Leu Met Met Asp Arg Val Val Lys Met Thr Glu Thr Gly Gly
        35                  40                  45

Asn Phe Asp Lys Gly Tyr Val Glu Ala Glu Leu Asp Ile Asn Pro Asp
    50                  55                  60

Leu Trp Phe Phe Gly Cys His Phe Ile Gly Asp Pro Val Met Pro Gly
65                  70                  75                  80

Cys Leu Gly Leu Asp Ala Met Trp Gln Leu Val Gly Phe Tyr Leu Gly
                85                  90                  95

Trp Leu Gly Gly Glu Gly Lys Gly Arg Ala Leu Gly Val Gly Glu Val
            100                 105                 110

Lys Phe Thr Gly Gln Val Leu Pro Thr Ala Lys Lys Val Thr Tyr Arg
        115                 120                 125

Ile His Phe Lys Arg Ile Val Asn Arg Arg Leu Ile Met Gly Leu Ala
    130                 135                 140

Asp Gly Glu Val Leu Val Asp Gly Arg Leu Ile Tyr Thr Ala Ser Asp
```

```
            145                 150                 155                 160
Leu Lys Val Gly Leu Phe Gln Asp Thr Ser Ala Phe Ser Thr Gln Asn
                165                 170                 175

Val Ala Ile Gln Thr Ala Ala Pro Val Ala Ser Ala Ser Asn Gly Leu
            180                 185                 190

Asp Ala Ala Gln Val Gln Gly Thr Met Val Asp Lys Arg Glu Ser Tyr
            195                 200                 205

Thr Lys Glu Asp Leu Leu Ala Ser Gly Arg Gly Glu Leu Phe Gly Ala
        210                 215                 220

Lys Gly Pro Gln Leu Pro Ala Pro Asn Met Leu Met Met Asp Arg Val
225                 230                 235                 240

Val Lys Met Thr Glu Thr Gly Gly Asn Phe Asp Lys Gly Tyr Val Glu
                245                 250                 255

Ala Glu Leu Asp Ile Asn Pro Asp Leu Trp Phe Phe Gly Cys His Phe
            260                 265                 270

Ile Gly Asp Pro Val Met Pro Gly Cys Leu Gly Leu Asp Ala Met Trp
        275                 280                 285

Gln Leu Val Gly Phe Tyr Leu Gly Trp Leu Gly Gly Glu Gly Lys Gly
        290                 295                 300

Arg Ala Leu Gly Val Gly Glu Val Lys Phe Thr Gly Gln Val Leu Pro
305                 310                 315                 320

Thr Ala Lys Lys Val Thr Tyr Arg Ile His Phe Lys Arg Ile Val Asn
                325                 330                 335

Arg Arg Leu Ile Met Gly Leu Ala Asp Gly Glu Val Leu Val Asp Gly
            340                 345                 350

Arg Leu Ile Tyr Thr Ala Ser Asp Leu Lys Val Gly Leu Phe Gln Asp
        355                 360                 365

Thr Ser Ala Phe
        370

<210> SEQ ID NO 2
<211> LENGTH: 330
<212> TYPE: PRT
<213> ORGANISM: Artificial Sequence
<220> FEATURE:
<223> OTHER INFORMATION: FabZ-Linker-FabZ

<400> SEQUENCE: 2

Met Thr Thr Asn Thr His Thr Leu Gln Ile Glu Glu Ile Leu Glu Leu
1               5                   10                  15

Leu Pro His Arg Phe Pro Phe Leu Leu Val Asp Arg Val Leu Asp Phe
                20                  25                  30

Glu Glu Gly Arg Phe Leu Arg Ala Val Lys Asn Val Ser Val Asn Glu
            35                  40                  45

Pro Phe Phe Gln Gly His Phe Pro Gly Lys Pro Ile Phe Pro Gly Val
        50                  55                  60

Leu Ile Leu Glu Ala Met Ala Gln Ala Thr Gly Ile Leu Ala Phe Lys
65                  70                  75                  80

Ser Val Gly Lys Leu Glu Pro Gly Glu Leu Tyr Tyr Phe Ala Gly Ile
                85                  90                  95

Asp Glu Ala Arg Phe Lys Arg Pro Val Val Pro Gly Asp Gln Met Ile
            100                 105                 110

Met Glu Val Thr Phe Glu Lys Thr Arg Arg Gly Leu Thr Arg Phe Lys
        115                 120                 125

Gly Val Ala Leu Val Asp Gly Lys Val Val Cys Glu Ala Thr Met Met
```

```
        130                 135                 140
Cys Ala Arg Ser Arg Glu Ala Ser Thr Gln Asn Val Ala Ile Gln Thr
145                 150                 155                 160

Ala Ala Pro Val Ala Ser Ala Ser Asn Gly Leu Asp Ala Ala Gln Val
                165                 170                 175

Gln Gly Thr Met Thr Thr Asn Thr His Thr Leu Gln Ile Glu Glu Ile
            180                 185                 190

Leu Glu Leu Leu Pro His Arg Phe Pro Phe Leu Leu Val Asp Arg Val
                195                 200                 205

Leu Asp Phe Glu Glu Gly Arg Phe Leu Arg Ala Val Lys Asn Val Ser
        210                 215                 220

Val Asn Glu Pro Phe Phe Gln Gly His Phe Pro Gly Lys Pro Ile Phe
225                 230                 235                 240

Pro Gly Val Leu Ile Leu Glu Ala Met Ala Gln Ala Thr Gly Ile Leu
                245                 250                 255

Ala Phe Lys Ser Val Gly Lys Leu Glu Pro Gly Glu Leu Tyr Tyr Phe
                260                 265                 270

Ala Gly Ile Asp Glu Ala Arg Phe Lys Arg Pro Val Val Pro Gly Asp
                275                 280                 285

Gln Met Ile Met Glu Val Thr Phe Glu Lys Thr Arg Arg Gly Leu Thr
        290                 295                 300

Arg Phe Lys Gly Val Ala Leu Val Asp Gly Lys Val Val Cys Glu Ala
305                 310                 315                 320

Thr Met Met Cys Ala Arg Ser Arg Glu Ala
                325                 330

<210> SEQ ID NO 3
<211> LENGTH: 351
<212> TYPE: PRT
<213> ORGANISM: Artificial Sequence
<220> FEATURE:
<223> OTHER INFORMATION: FabA-Linker-FabZ

<400> SEQUENCE: 3

Met Val Asp Lys Arg Glu Ser Tyr Thr Lys Glu Asp Leu Leu Ala Ser
1               5                   10                  15

Gly Arg Gly Glu Leu Phe Gly Ala Lys Gly Pro Gln Leu Pro Ala Pro
            20                  25                  30

Asn Met Leu Met Met Asp Arg Val Val Lys Met Thr Glu Thr Gly Gly
        35                  40                  45

Asn Phe Asp Lys Gly Tyr Val Glu Ala Glu Leu Asp Ile Asn Pro Asp
    50                  55                  60

Leu Trp Phe Phe Gly Cys His Phe Ile Gly Asp Pro Val Met Pro Gly
65                  70                  75                  80

Cys Leu Gly Leu Asp Ala Met Trp Gln Leu Val Gly Phe Tyr Leu Gly
                85                  90                  95

Trp Leu Gly Gly Glu Gly Lys Gly Arg Ala Leu Gly Val Gly Glu Val
            100                 105                 110

Lys Phe Thr Gly Gln Val Leu Pro Thr Ala Lys Lys Val Thr Tyr Arg
        115                 120                 125

Ile His Phe Lys Arg Ile Val Asn Arg Arg Leu Ile Met Gly Leu Ala
    130                 135                 140

Asp Gly Glu Val Leu Val Asp Gly Arg Leu Ile Tyr Thr Ala Ser Asp
145                 150                 155                 160

Leu Lys Val Gly Leu Phe Gln Asp Thr Ser Ala Phe Ser Thr Gln Asn
```

```
                    165                 170                 175
Val Ala Ile Gln Thr Ala Ala Pro Val Ala Ser Ala Ser Asn Gly Leu
                180                 185                 190

Asp Ala Ala Gln Val Gln Gly Thr Met Thr Thr Asn Thr His Thr Leu
            195                 200                 205

Gln Ile Glu Glu Ile Leu Glu Leu Leu Pro His Arg Phe Pro Phe Leu
        210                 215                 220

Leu Val Asp Arg Val Leu Asp Phe Glu Gly Arg Phe Leu Arg Ala
225                 230                 235                 240

Val Lys Asn Val Ser Val Asn Glu Pro Phe Phe Gln Gly His Phe Pro
                245                 250                 255

Gly Lys Pro Ile Phe Pro Gly Val Leu Ile Leu Glu Ala Met Ala Gln
                260                 265                 270

Ala Thr Gly Ile Leu Ala Phe Lys Ser Val Gly Lys Leu Glu Pro Gly
                275                 280                 285

Glu Leu Tyr Tyr Phe Ala Gly Ile Asp Glu Ala Arg Phe Lys Arg Pro
            290                 295                 300

Val Val Pro Gly Asp Gln Met Ile Met Glu Val Thr Phe Glu Lys Thr
305                 310                 315                 320

Arg Arg Gly Leu Thr Arg Phe Lys Gly Val Ala Leu Val Asp Gly Lys
                325                 330                 335

Val Val Cys Glu Ala Thr Met Met Cys Ala Arg Ser Arg Glu Ala
                340                 345                 350

<210> SEQ ID NO 4
<211> LENGTH: 350
<212> TYPE: PRT
<213> ORGANISM: Artificial Sequence
<220> FEATURE:
<223> OTHER INFORMATION: FabZ-Linker-FabA

<400> SEQUENCE: 4

Met Thr Thr Asn Thr His Thr Leu Gln Ile Glu Glu Ile Leu Glu Leu
1               5                   10                  15

Leu Pro His Arg Phe Pro Phe Leu Leu Val Asp Arg Val Leu Asp Phe
                20                  25                  30

Glu Glu Gly Arg Phe Leu Arg Ala Val Lys Asn Val Ser Val Asn Glu
            35                  40                  45

Pro Phe Phe Gln Gly His Phe Pro Gly Lys Pro Ile Phe Pro Gly Val
        50                  55                  60

Leu Ile Leu Glu Ala Met Ala Gln Ala Thr Gly Ile Leu Ala Phe Lys
65                  70                  75                  80

Ser Val Gly Lys Leu Glu Pro Gly Glu Leu Tyr Tyr Phe Ala Gly Ile
                85                  90                  95

Asp Glu Ala Arg Phe Lys Arg Pro Val Val Pro Gly Asp Gln Met Ile
            100                 105                 110

Met Glu Val Thr Phe Glu Lys Thr Arg Arg Gly Leu Thr Arg Phe Lys
        115                 120                 125

Gly Val Ala Leu Val Asp Gly Lys Val Val Cys Glu Ala Thr Met Met
130                 135                 140

Cys Ala Arg Ser Arg Glu Ala Ser Thr Gln Asn Val Ala Ile Gln Thr
145                 150                 155                 160

Ala Ala Pro Val Ala Ser Ala Ser Asn Gly Leu Asp Ala Ala Gln Val
                165                 170                 175

Gln Gly Thr Met Val Asp Lys Arg Glu Ser Tyr Thr Lys Glu Asp Leu
```

```
                180                 185                 190
Leu Ala Ser Gly Arg Gly Glu Leu Phe Gly Ala Lys Gly Pro Gln Leu
            195                 200                 205

Pro Ala Pro Asn Met Leu Met Met Asp Arg Val Val Lys Met Thr Glu
210                 215                 220

Thr Gly Gly Asn Phe Asp Lys Gly Tyr Val Glu Ala Glu Leu Asp Ile
225                 230                 235                 240

Asn Pro Asp Leu Trp Phe Phe Gly Cys His Phe Ile Gly Asp Pro Val
                245                 250                 255

Met Pro Gly Cys Leu Gly Leu Asp Ala Met Trp Gln Leu Val Gly Phe
            260                 265                 270

Tyr Leu Gly Trp Leu Gly Gly Glu Gly Lys Gly Arg Ala Leu Gly Val
            275                 280                 285

Gly Glu Val Lys Phe Thr Gly Gln Val Leu Pro Thr Ala Lys Lys Val
            290                 295                 300

Thr Tyr Arg Ile His Phe Lys Arg Ile Val Asn Arg Leu Ile Met
305                 310                 315                 320

Gly Leu Ala Asp Gly Glu Val Leu Val Asp Gly Arg Leu Ile Tyr Thr
                325                 330                 335

Ala Ser Asp Leu Lys Val Gly Leu Phe Gln Asp Thr Ser Ala
                340                 345                 350

<210> SEQ ID NO 5
<211> LENGTH: 24
<212> TYPE: DNA
<213> ORGANISM: Artificial Sequence
<220> FEATURE:
<223> OTHER INFORMATION: fabA Fwd TOPO

<400> SEQUENCE: 5
caccatggta gataaacgcg aatc                                              24

<210> SEQ ID NO 6
<211> LENGTH: 31
<212> TYPE: DNA
<213> ORGANISM: Artificial Sequence
<220> FEATURE:
<223> OTHER INFORMATION: fabA Rv + Overhang

<400> SEQUENCE: 6
acattttgtg tagagaaggc gacgtatcct g                                      31

<210> SEQ ID NO 7
<211> LENGTH: 34
<212> TYPE: DNA
<213> ORGANISM: Artificial Sequence
<220> FEATURE:
<223> OTHER INFORMATION: fabA Fwd + Overhang

<400> SEQUENCE: 7
aagttcaagg cacaatggta gataaacgcg aatc                                   34

<210> SEQ ID NO 8
<211> LENGTH: 21
<212> TYPE: DNA
<213> ORGANISM: Artificial Sequence
<220> FEATURE:
<223> OTHER INFORMATION: fabA Rv + Stop

<400> SEQUENCE: 8
ttagaaggca gacgtatcct g                                                 21
```

<210> SEQ ID NO 9
<211> LENGTH: 30
<212> TYPE: DNA
<213> ORGANISM: Artificial Sequence
<220> FEATURE:
<223> OTHER INFORMATION: fabZ Fwd TOPO

<400> SEQUENCE: 9
caccatgact actaacactc atactctgca                              30

<210> SEQ ID NO 10
<211> LENGTH: 30
<212> TYPE: DNA
<213> ORGANISM: Artificial Sequence
<220> FEATURE:
<223> OTHER INFORMATION: fabZ Rv + Overhang

<400> SEQUENCE: 10
tacattttgt gtagaggcct cccggctacg                              30

<210> SEQ ID NO 11
<211> LENGTH: 41
<212> TYPE: DNA
<213> ORGANISM: Artificial Sequence
<220> FEATURE:
<223> OTHER INFORMATION: fabZ Fwd + Overhang

<400> SEQUENCE: 11
acaagttcaa ggcacaatga ctactaacac tctactctgc a                 41

<210> SEQ ID NO 12
<211> LENGTH: 19
<212> TYPE: DNA
<213> ORGANISM: Artificial Sequence
<220> FEATURE:
<223> OTHER INFORMATION: fabA Rv + Stop 12

<400> SEQUENCE: 12
ttaggcctcc cggctacga                                          19

<210> SEQ ID NO 13
<211> LENGTH: 22
<212> TYPE: DNA
<213> ORGANISM: Artificial Sequence
<220> FEATURE:
<223> OTHER INFORMATION: pfaA Fwd

<400> SEQUENCE: 13
tctacacaaa atgtagcgat tc                                      22

<210> SEQ ID NO 14
<211> LENGTH: 20
<212> TYPE: DNA
<213> ORGANISM: Artificial Sequence
<220> FEATURE:
<223> OTHER INFORMATION: pfaA Rev

<400> SEQUENCE: 14
tgtgccttga acttgtgctg                                         20

<210> SEQ ID NO 15
<211> LENGTH: 28
<212> TYPE: PRT
<213> ORGANISM: Artificial Sequence
<220> FEATURE:

<223> OTHER INFORMATION: Multi-Domain PUFA synthase

<400> SEQUENCE: 15

Ser Thr Gln Asn Val Ala Ile Gln Thr Ala Ala Pro Val Ala Ser Ala
1               5                   10                  15

Ser Asn Gly Leu Asp Ala Ala Gln Val Gln Gly Thr
            20                  25

<210> SEQ ID NO 16
<211> LENGTH: 172
<212> TYPE: PRT
<213> ORGANISM: Artificial Sequence
<220> FEATURE:
<223> OTHER INFORMATION: FabA of E. coli

<400> SEQUENCE: 16

Met Val Asp Lys Arg Glu Ser Tyr Thr Lys Glu Asp Leu Leu Ala Ser
1               5                   10                  15

Gly Arg Gly Glu Leu Phe Gly Ala Lys Gly Pro Gln Leu Pro Ala Pro
            20                  25                  30

Asn Met Leu Met Met Asp Arg Val Val Lys Met Thr Glu Thr Gly Gly
        35                  40                  45

Asn Phe Asp Lys Gly Tyr Val Glu Ala Glu Leu Asp Ile Asn Pro Asp
    50                  55                  60

Leu Trp Phe Phe Gly Cys His Phe Ile Gly Asp Pro Val Met Pro Gly
65                  70                  75                  80

Cys Leu Gly Leu Asp Ala Met Trp Gln Leu Val Gly Phe Tyr Leu Gly
                85                  90                  95

Trp Leu Gly Gly Glu Gly Lys Gly Arg Ala Leu Gly Val Gly Glu Val
            100                 105                 110

Lys Phe Thr Gly Gln Val Leu Pro Thr Ala Lys Lys Val Thr Tyr Arg
        115                 120                 125

Ile His Phe Lys Arg Ile Val Asn Arg Arg Leu Ile Met Gly Leu Ala
    130                 135                 140

Asp Gly Glu Val Leu Val Asp Gly Arg Leu Ile Tyr Thr Ala Ser Asp
145                 150                 155                 160

Leu Lys Val Gly Leu Phe Gln Asp Thr Ser Ala Phe
                165                 170

<210> SEQ ID NO 17
<211> LENGTH: 151
<212> TYPE: PRT
<213> ORGANISM: Artificial Sequence
<220> FEATURE:
<223> OTHER INFORMATION: FabZ of E. coli

<400> SEQUENCE: 17

Met Thr Thr Asn Thr His Thr Leu Gln Ile Glu Glu Ile Leu Glu Leu
1               5                   10                  15

Leu Pro His Arg Phe Pro Phe Leu Leu Val Asp Arg Val Leu Asp Phe
            20                  25                  30

Glu Glu Gly Arg Phe Leu Arg Ala Val Lys Asn Val Ser Val Asn Glu
        35                  40                  45

Pro Phe Phe Gln Gly His Phe Pro Gly Lys Pro Ile Phe Pro Gly Val
    50                  55                  60

Leu Ile Leu Glu Ala Met Ala Gln Ala Thr Gly Ile Leu Ala Phe Lys
65                  70                  75                  80

Ser Val Gly Lys Leu Glu Pro Gly Glu Leu Tyr Tyr Phe Ala Gly Ile

|   |   | 85 |   |   |   | 90 |   |   |   | 95 |   |   |
|---|---|---|---|---|---|---|---|---|---|---|---|---|
| Asp | Glu | Ala | Arg<br>100 | Phe | Lys | Arg | Pro | Val<br>105 | Val | Pro | Gly | Asp | Gln<br>110 | Met | Ile |

Met | Glu | Val<br>115 | Thr | Phe | Glu | Lys | Thr<br>120 | Arg | Arg | Gly | Leu | Thr<br>125 | Arg | Phe | Lys

Gly | Val | Ala | Leu<br>130 | Val | Asp | Gly | Lys<br>135 | Val | Val | Cys | Glu<br>140 | Ala | Thr | Met | Met

Cys | Ala | Arg | Ser | Arg | Glu | Ala
145 |   |   |   | 150

ARTIFICIAL FUSION OF DEHYDRATASE ENZYMES TO IMPROVE PRODUCTION OF FATTY ACIDS

CROSS-REFERENCE TO RELATED APPLICATIONS

The present application is a national stage entry of PCT/US2020/021077 filed Mar. 5, 2020, which claims priority to U.S. Provisional Application No. 62/815,676 filed Mar. 8, 2019, the contents of each of which are hereby incorporated by reference.

STATEMENT REGARDING FEDERALLY SPONSORED RESEARCH

This invention was made with government support under award numbers CHE0953254 awarded by the National Science Foundation and R25M061838 awarded by the National Institute of Health. The government has certain rights in the invention.

REFERENCE TO AN ELECTRONIC SEQUENCE LISTING

The instant application contains a Sequence Listing which has been submitted electronically as a text file in ASCII and is hereby incorporated by reference in its entirety pursuant to 37 C.F.R. § 1.821. The name of the ASCII text file is "19-184-WO-US_Sequence_File_ST25_v2.txt", was created on Jun. 30, 2022, and is 17.5 Kb in size.

FIELD OF THE INVENTION

The present disclosure relates to biosynthesis of fatty acids. More specifically, the disclosure relates to fused dehydratase enzyme homodimers and heterodimers that are used to enhance biosynthesis of fatty acids both in vivo and in vitro. The disclosure further relates to methods for making fused homodimers and fused heterodimers.

BACKGROUND

Fatty acid (FA) biosynthesis in bacterial and microbial cultures offers a promising solution to sustainable generation of biofuels and biomaterials. For example, FA production in *E. coli* has the advantages of low environmental impact, short production times, and ease of genetic manipulation. Consistent with this, free fatty acids produced in the metabolic pathways of bacteria such as *Escherichia coli* (*E. coli*) can be used, for instance, as precursors for biofuels (Magnuson, K., et al. J Regulation of fatty acid biosynthesis in *Escherichia coli*. *Microbiol. Rev.* 57, 522-542 (1993).

Figure 1:
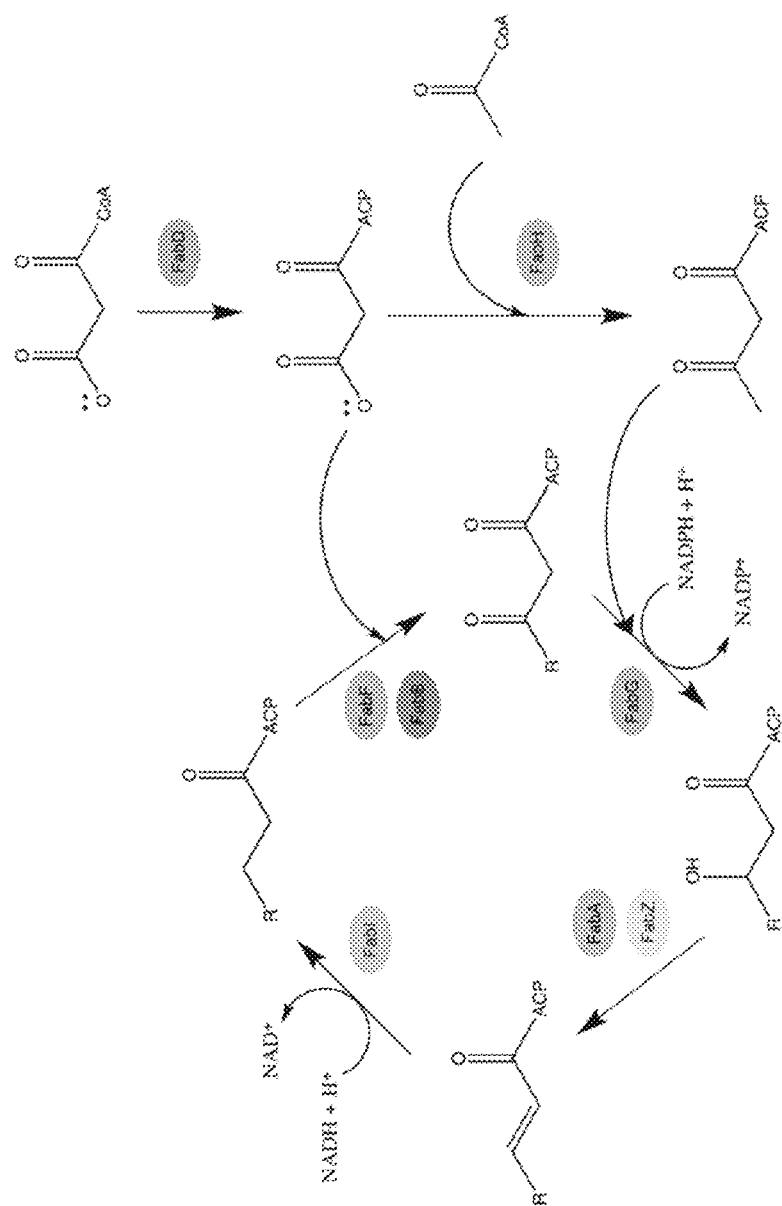
Figure 2:
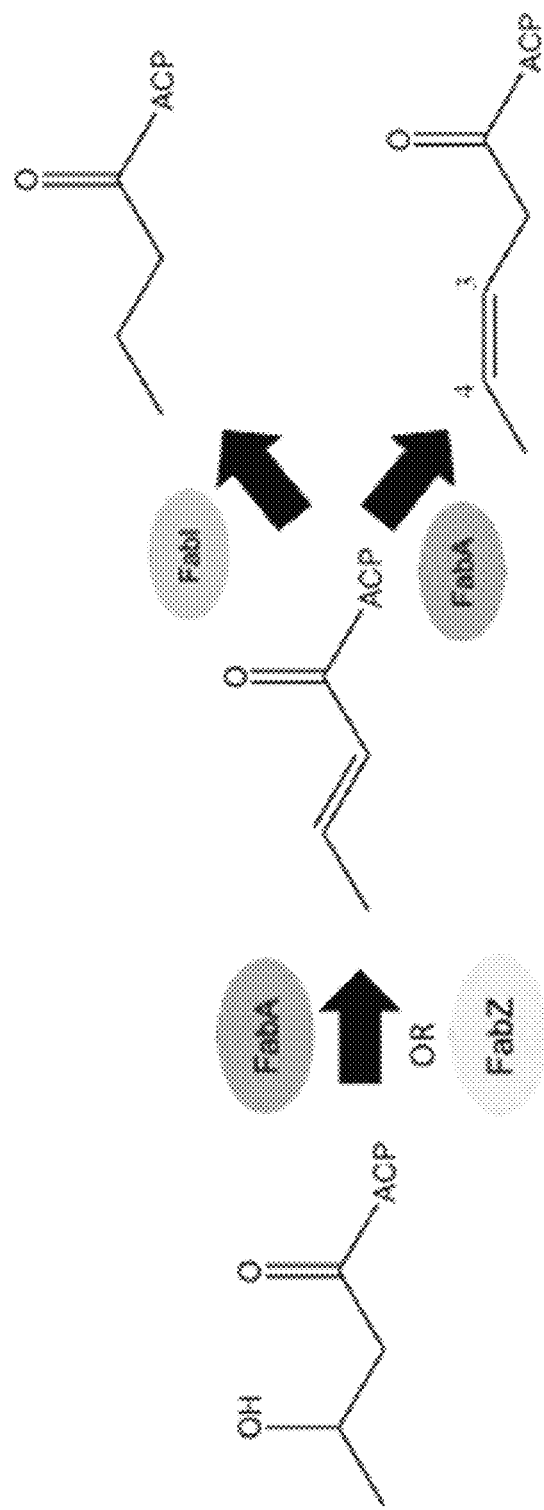

FA biosynthesis is a ubiquitous pathway across organisms of varied phylogenies. Specifically, FA synthesis requires concerted action by multiple enzymes that catalyze condensation of acyl units. Elongation cycles, consisting of four reactions, extends acyl chain length by two carbons (FIG. 1). An intermediate reaction in FA synthesis uses FabA beta-hydroxyacyl-acyl carrier protein dehydratase subunit (FabA) or a FabZ beta-hydroxyacyl-acyl carrier protein dehydratase subunit (FabZ) to catalyze dehydration of β-hydroxyacyl intermediates in the elongation cycle. This dehydration forms a 2,3-trans double bond, a key step in fatty acid synthesis (FIG. 2).

Figure 3:
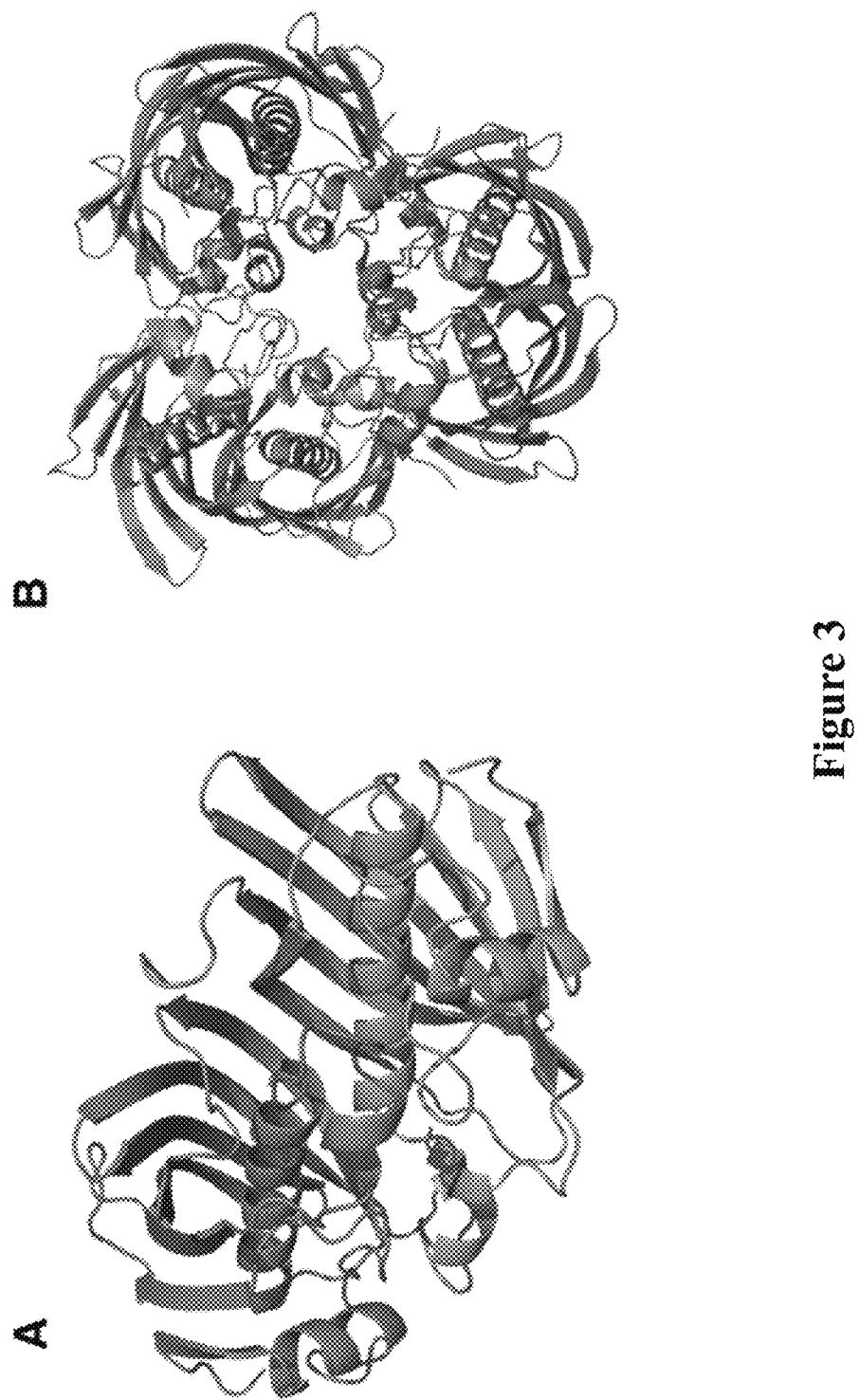

FabA and FabZ naturally function as obligate dimers (i.e. FabA-FabA or FabZ-FabZ) that adopt a double "hotdog" dimeric structure in which antiparallel β-sheets wrap around a central hydrophobic alpha-helix (FIG. 3; Dillon, S. C. & Bateman, A. The hotdog fold: wrapping up a superfamily of thioesterases and dehydratases. BMC Bioinformatics 5, 109; 2004). FabA active sites are formed in equal part by both FabA subunits, but are independent and fail to display any cooperation in formation of the active site. In contrast, the FabZ dimer active site is formed by a hexamer composed of a trimer of dimers. However, FabZ is largely insoluble when overexpressed by itself and thus, unsuitable for applications that require large amounts of enzyme. In addition, within *E. coli*, naturally occurring FabA-FabA or FabZ-FabZ dimers are unable to yield fatty acids at industrially relevant levels. This deficiency substantially limits uses of microbial cultures for fatty acid production in biofuel, agriculture, and human nutrition fields.

There remains a need in this art for more efficient FA biosynthesis using improved FabA beta-hydroxyacyl-acyl carrier protein dehydratase subunit (FabA) or a FabZ beta-hydroxyacyl-acyl carrier protein dehydratase subunit (FabZ). For examples, the engineering or optimization of existing *E. coli* enzymes so as to increase their catalytic activity and thus enhance fatty acid production remains unexplored.

SUMMARY

The present disclosure provides an protein for artificial fusion of dehydratase enzymes and thereby provides improved production of fatty acids. The disclosure also provides methods for making these constructs.

In a first aspect, the disclosure provides a heterodimer protein, comprising a FabA beta-hydroxyacyl-acyl carrier protein dehydratase subunit (FabA), a FabZ beta-hydroxyacyl-acyl carrier protein dehydratase subunit (FabZ) and a peptide linker covalently linked to the two protein subunits.

In one embodiment of the heterodimer protein FabA and FabZ are joined via the peptide linker to create a fused dimer. In a further aspect of the embodiment, the peptide linker is a polyunsaturated fatty acid synthase peptide from *Photobacterium profundum*.

In yet a further embodiment the fused homodimer peptide linker has polypeptide sequence according to SEQ ID NO. 15, or a polypeptide with at least 75% identity to SEQ ID NO. 15, or homologs or functionally conserved variants thereof.

In another aspect the heterodimer protein is characterized by the carboxyl terminus of the FabA subunit being covalently linked to the amino terminus of the peptide linker, and the carboxyl terminus of the peptide linker being covalently linked to the amino terminus of the FabZ subunit. In yet a further aspect, the heterodimer protein is characterized by the carboxyl terminus of the FabZ subunit being covalently linked to the amino terminus of the peptide linker, and the carboxyl terminus of the peptide linker being covalently linked to the amino terminus of the FabA subunit. In both aspects, the configurations are a forced heterodimer. In yet another aspect the homodimer or heterodimer subunits are joined in the absence of a peptide linker.

In a further aspect, the FabA-peptide linker-FabZ and FabZ-peptide linker-FabA configurations enhance FabZ activity compared to a FabZ-FabZ homodimer.

In yet another aspect, the disclosure provides enhanced enzyme efficiency in catalyzing hydration of crotonyl using the FabA-peptide linker-FabZ or FabZ-peptide linker-FabA configuration compared to either unfused FabA or FabZ.

In still another aspect, conversion of beta-hydroxybutyryl-CoA to crotonyl-CoA is detectable by mass spectrometry. In a further aspect, the FabZ-peptide linker-FabA and FabA-peptide linker-FabZ heterodimers have enhanced in vitro fatty acid production when compared to the FabA or FabZ parent enzymes. Still further, the fused dimers enhance in vitro fatty acid production when compared to the FabZ-FabZ or FabA-FabA homodimers.

As further provided in this disclosure, insertion of the fused heterodimers disclosed herein into *E. coli* cultures increases in vivo fatty acid production when compared to FabA and FabZ parent enzymes. Still further, overexpression of FabA-peptide linker-FabZ and FabZ-peptide linker-FabA enhances in vivo total fatty acid yields in *E. coli* compared to FabA and FabZ parent enzymes.

In another embodiment, a fused homodimer protein is provided herein, comprised of a FabA beta-hydroxyacyl-acyl carrier protein dehydratase subunit (FabA) or FabZ beta-hydroxyacyl-acyl carrier protein dehydratase subunit (FabZ), fused by a peptide linker.

In one aspect, the fused homodimer enzyme is comprised of two copies of FabA fused by a peptide linker. In a further aspect the fused homodimer is comprised of two copies of FabZ fused by a peptide linker.

In yet a further aspect, the peptide linker is a polyunsaturated fatty acid synthase peptide from *Photobacterium profundum*. In another aspect the peptide linker has a polypeptide sequence according to SEQ ID NO. 15, or a polypeptide with at least 75% identity to SEQ ID NO. 15 or homologs or functionally conserved variants thereof.

As provided in this disclosure, the fused FabA-peptide linker-FabA homodimer expressed in *E. coli* enhances protein production compared to a parent FabA molecule expressed in *E. coli*.

As further provided in this disclosure, the fused FabZ-peptide linker-FabZ homodimer has enhanced solubility compared to a parent FabZ molecule.

As yet further provided in this disclosure, the ability of the fused FabZ-peptide linker-FabZ to hydrate crotonyl-CoA is increased compared to a FabZ native dimer.

The current disclosure also teaches methods for making a fused heterodimer. In the preferred method a FabA beta-hydroxyacyl-acyl carrier protein dehydratase subunit (FabA), a FabZ beta-hydroxyacyl-acyl carrier protein dehydratase subunit (FabZ), and a peptide linker are produced by methods comprising the steps of
a) performing sequential PCR reactions to generate FabA-FabZ heterodimers with or without a peptide linker;
b) adding primers at the beginning of PCR reaction IV;
c) cloning a construct into expression vectors;
d) transforming the expression vectors into a cell; and
e) verifying the sequence of the FabA-FabZ heterodimer construct, with or without a peptide linker.

In particular embodiments of the methods provided by the invention, the forced dimer requires that the FabA or FabZ gene be amplified using a reverse primer that contains an overhang complementary to the 5' terminus of the peptide linker gene. In further particular embodiments either the FabA or FabZ gene is amplified using a forward primer containing an additional sequence complementary to the 3' terminus of the peptide linker gene.

Amplification is followed by purification of the FabA and FabZ genes containing the overhang and the FabA or FabZ gene with the overhang is fused to the peptide linker to generate afab-linker intermediate.

In the preferred method, the FabA gene with an overhang complementary to the 5' terminus of the peptide linker gene is fused with the FabZ gene containing an additional sequence complementary to the 3' terminus of the peptide linker gene. In a particular method the fusion is followed by a final PCR reaction is used to generate the full length fabA-peptide linker-FabZ construct.

Further, in certain embodiments of the methods disclosed herein, the sequence of the fabA-peptide linker-FabZ construct heterodimer sequence is determined and compared to the expected sequence.

In another preferred embodiment, the fabZ gene with an overhang complementary to the 5' terminus of the peptide linker gene is fused with the fabA gene containing an additional sequence complementary to the 3' terminus of the peptide linker gene. In one aspect a final PCR reaction is performed to generate the full length FabZ-peptide linker-FabA construct.

In the preferred aspect the sequence of the fabZ-peptide linker-FabA construct heterodimer sequence is determined and compared to the expected sequence These and other features and advantages of the present invention will be more fully understood from the following detailed description taken together with the accompanying claims. It is noted that the scope of the claims is defined by the recitations therein and not by the specific discussion of features and advantages set forth in the present description.

BRIEF DESCRIPTIONS OF THE DRAWINGS

FIG. 1. Fatty acid biosynthesis pathway in *E. coli*. In *E. coli*, fatty acids are produced using a type II fatty acid synthase. The enzymatic domains are discrete entities which are contained in separate proteins. Thus, each reaction of the cycle is catalyzed by a separate protein, and each protein is encoded by a different gene.

FIG. 2. FabA and FabZ catalyzed dehydration of fatty acyl-ACP intermediates. FabA catalyzes an additional double bond isomerization step to form the 3,4 cis double bond.

FIG. 3. Three-dimensional structures of bacterial FabA and FabZ. Structures resolved by X-Ray diffraction reveal FabA and FabZ belong to the hot-dog fold superfamily.

FIG. 3A shows FabA from *E. coli* (PDB1MKB) is a homodimer, with two identical subunits forming a double hot-dog fold. Each color indicates one subunit. In FIG. 3B the crystal structure of FabZ from *P. aeruginosa* (PDB1U1Z) reveals a hexameric protein, essentially consisting of a trimer-of-dimers.

Figure 4:
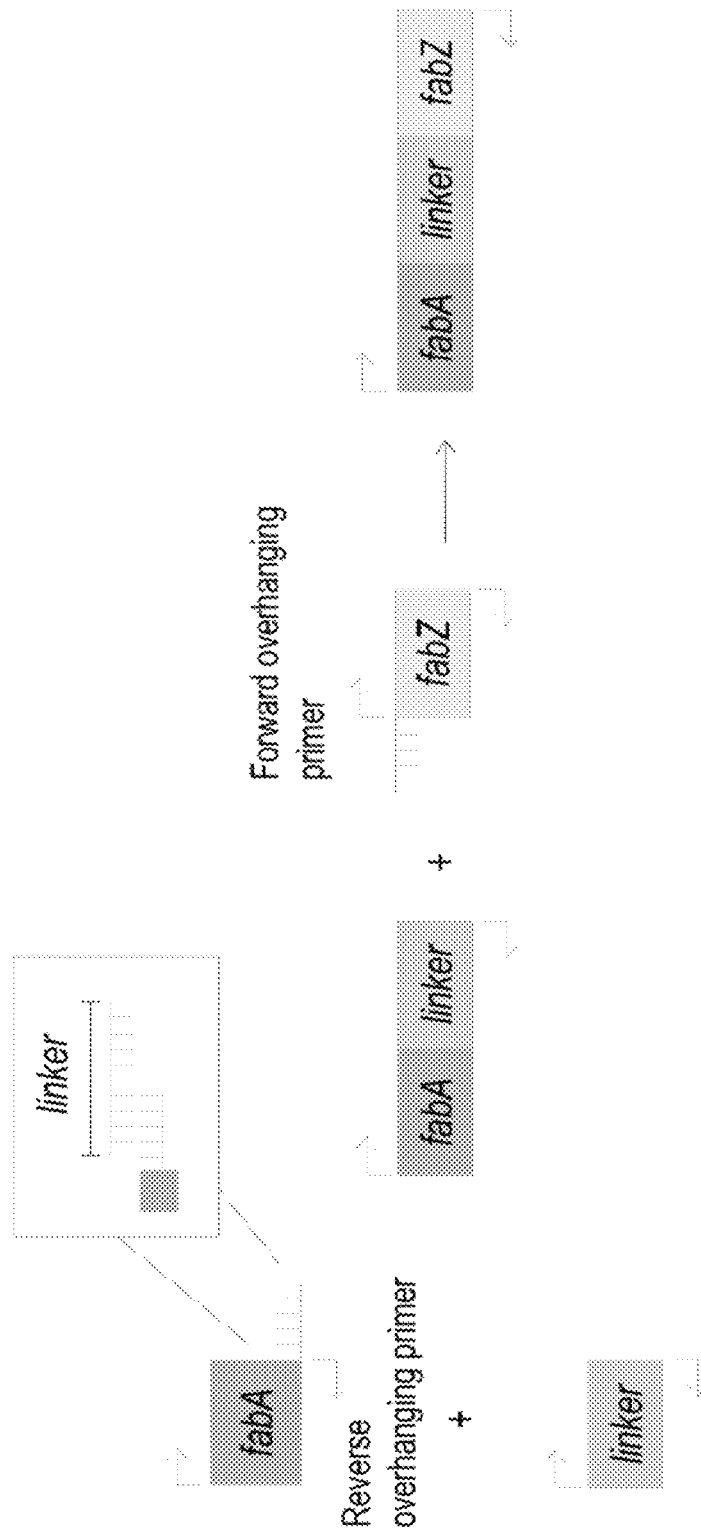

FIG. 4. Generation of hybridfab gene constructs. A) Panel A shows the amplification of fabA and fabZ fused with the linker fragment. B) Panel B shows the amplification of the finalized fabA-fabZ and fabZ-fabA resulting from a combination of fabA/fabZ-linker with fabA or fabZ.

Figure 5:
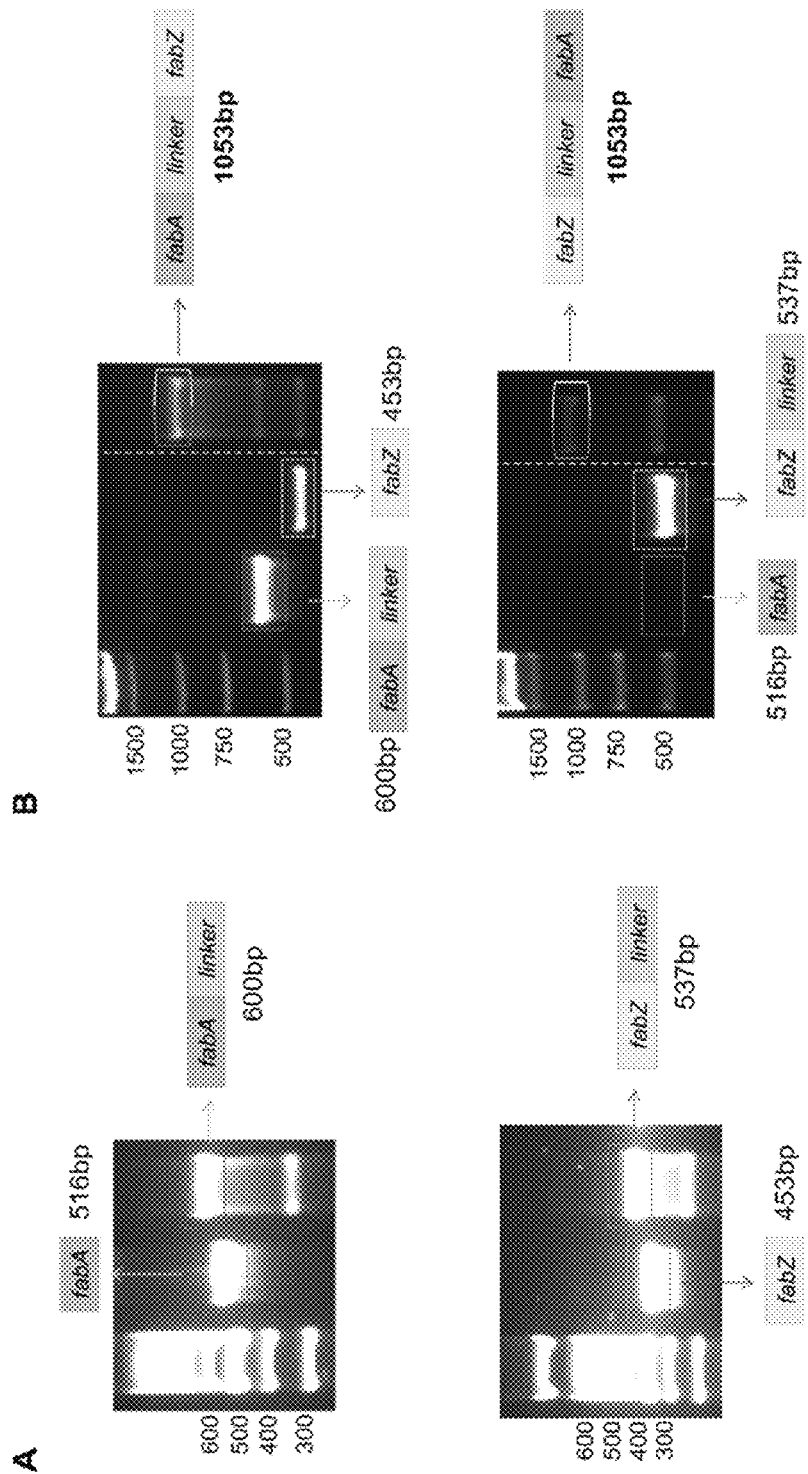

FIG. 5. Schematics for the preparation of fused dimers. Designed primers for the amplification of fabA/Z contain overhangs complementary to the linker region from pfaA gene of *P. profundum*. PCR products with overhangs are purified and then mixed in a subsequent PCR. Overhangs will anneal to each other and link both genes.

Figure 6:
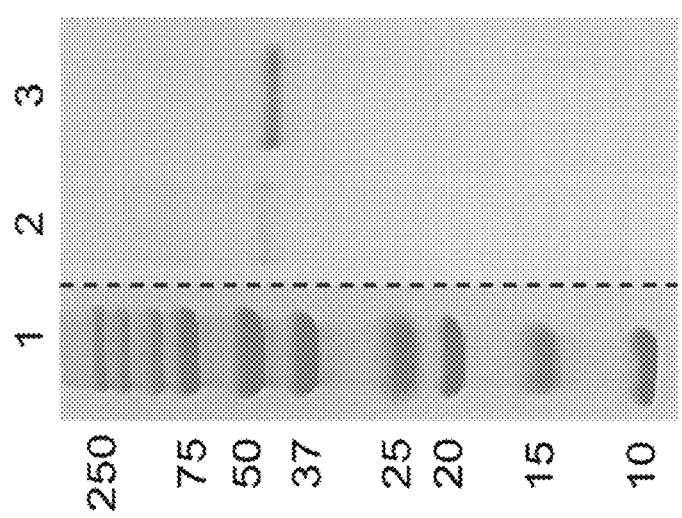

FIG. 6. Protein purification and yields. Proteins were purified using NiNTA affinity chromatography at a purity of >95% based on SDS-PAGE analysis. Lane 1: Precision Plus Protein Standards, lane 2: FabA-FabZ, lane 3: FabZ-FabA. The yields were 4.61, and 5.42 mg/mL for FabA-FabZ and FabZ-FabA, respectively.

Figure 7:
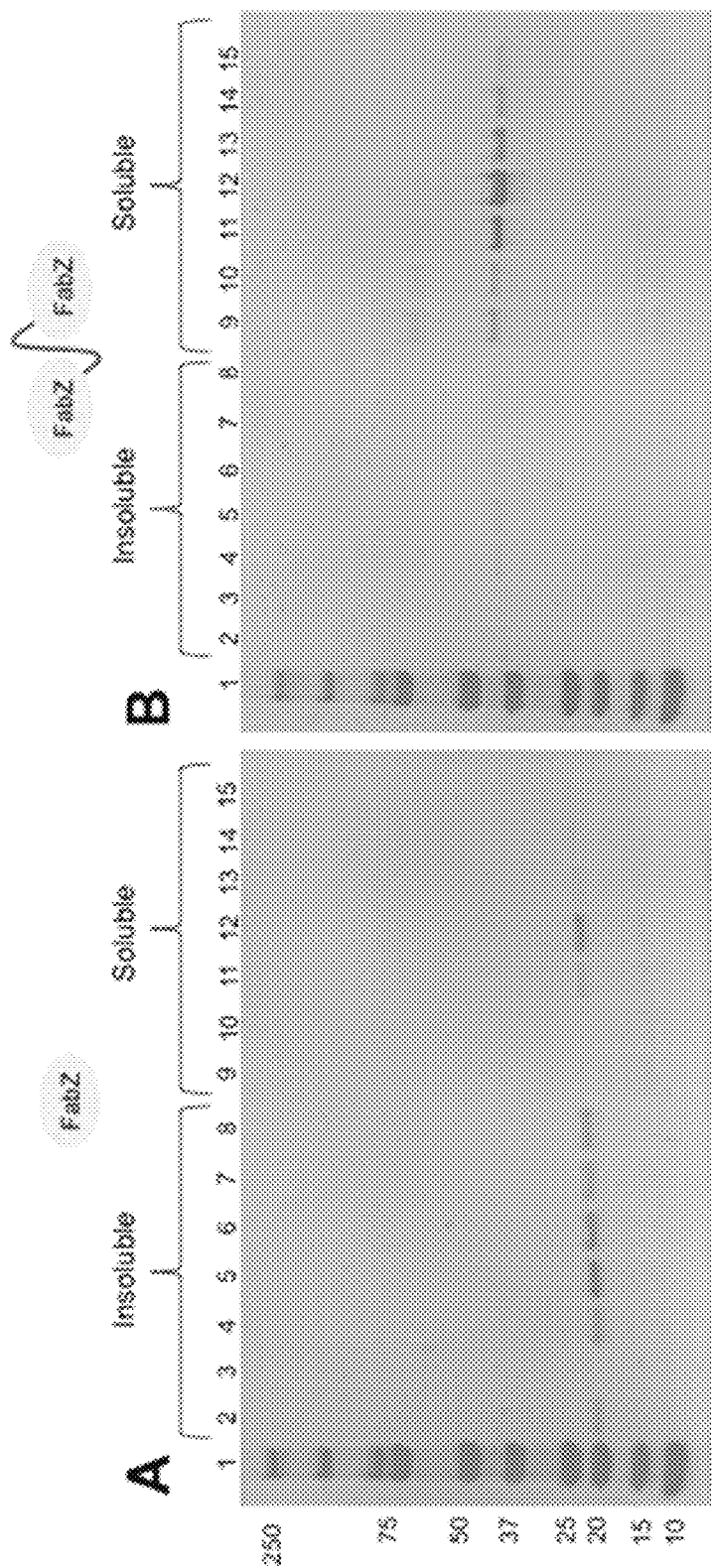

FIG. 7. Soluble versus insoluble yields of FabZ and FabZ-FabZ. Both the lysis supernatant and the lysis pellet were loaded into a Ni21-sepharose column both for (A)

FabZ and (B) FabZ-FabZ. Lane 1: Protein Ladder; Lanes 2-8 contain the elution fractions from the resolubilized lysis pellet; Lanes 9-15 contain the elution fractions from the soluble supernatant) The FabZ was mostly found in the insoluble lysis pellet (0.30 vs. 0.16 mg/L soluble), whereas the FabZ-FabZ, was mostly recovered from the soluble supernatant at 2.75 mg/L.

Figure 8:
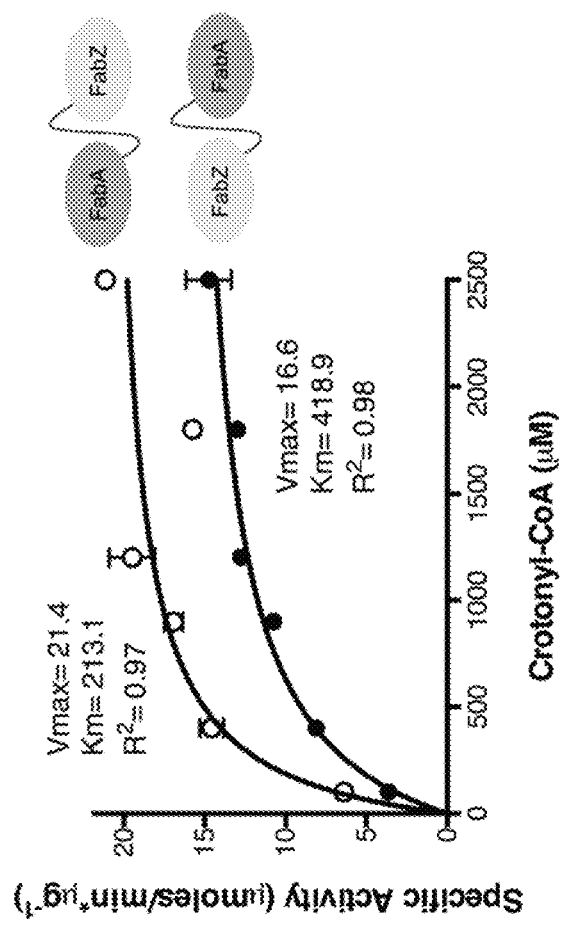

FIG. 8. Enzyme kinetics assays. Initial velocities of crotonyl-CoA hydration were expressed in enzyme units per g of enzyme. The measurements were performed in triplicate and the error bars represent the standard deviation. The specific activity values for FabA-FabZ, and FabZ-FabA were 21.1 and 16.6 μmoles/min*μg-1, respectively. The Km values were 213.1 μM for FabA-FabZ, and 418.9 μM for FabZ-FabA. These Vmax values correspond to a 32-fold enhancement for FabA-FabZ, and 13-fold enhancement for FabZ-FabA, when compared to FabZ activity.

Figure 9:
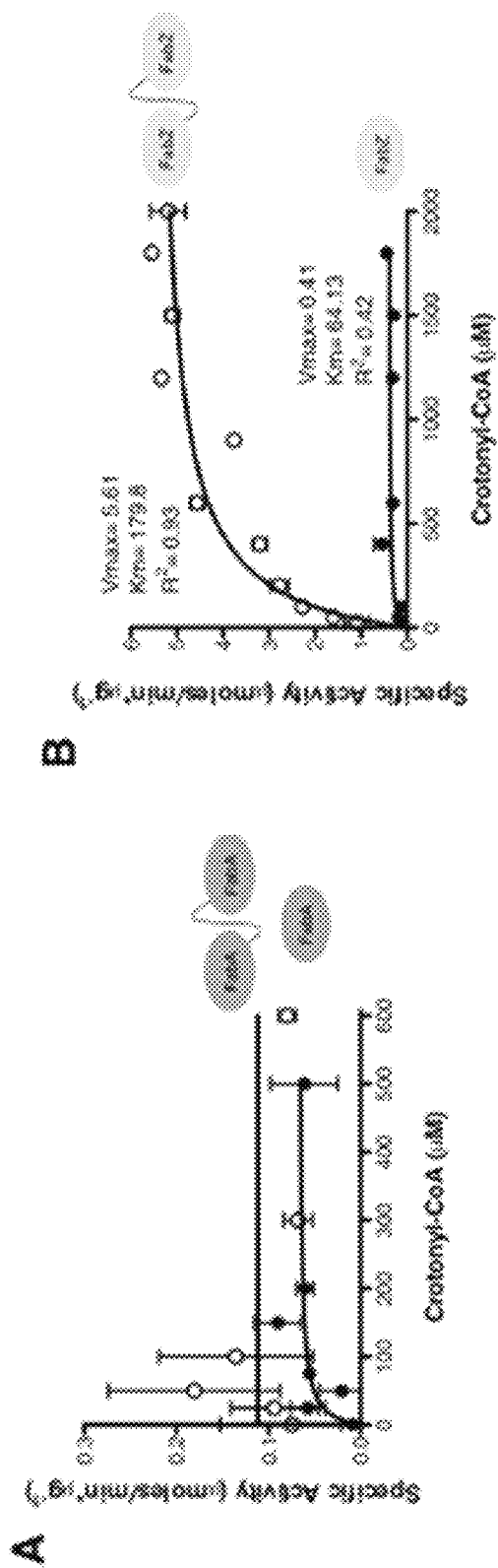

FIG. 9. Enzyme kinetic assays in FabA, the FabA-FabA monomer, FabZ, and the FabZ-FabZ monomer. Initial velocities of crotonyl-CoA hydration were expressed in enzyme units per g of enzyme. The measurements were performed in triplicate and the error bars represent the standard deviation. (A) The enzyme activity for FabA and FabA-FabA was minimal. (B) FabZ-FabZ shows a significant ninefold increase in Vmax compared to wild-type FabZ.

Figure 10:
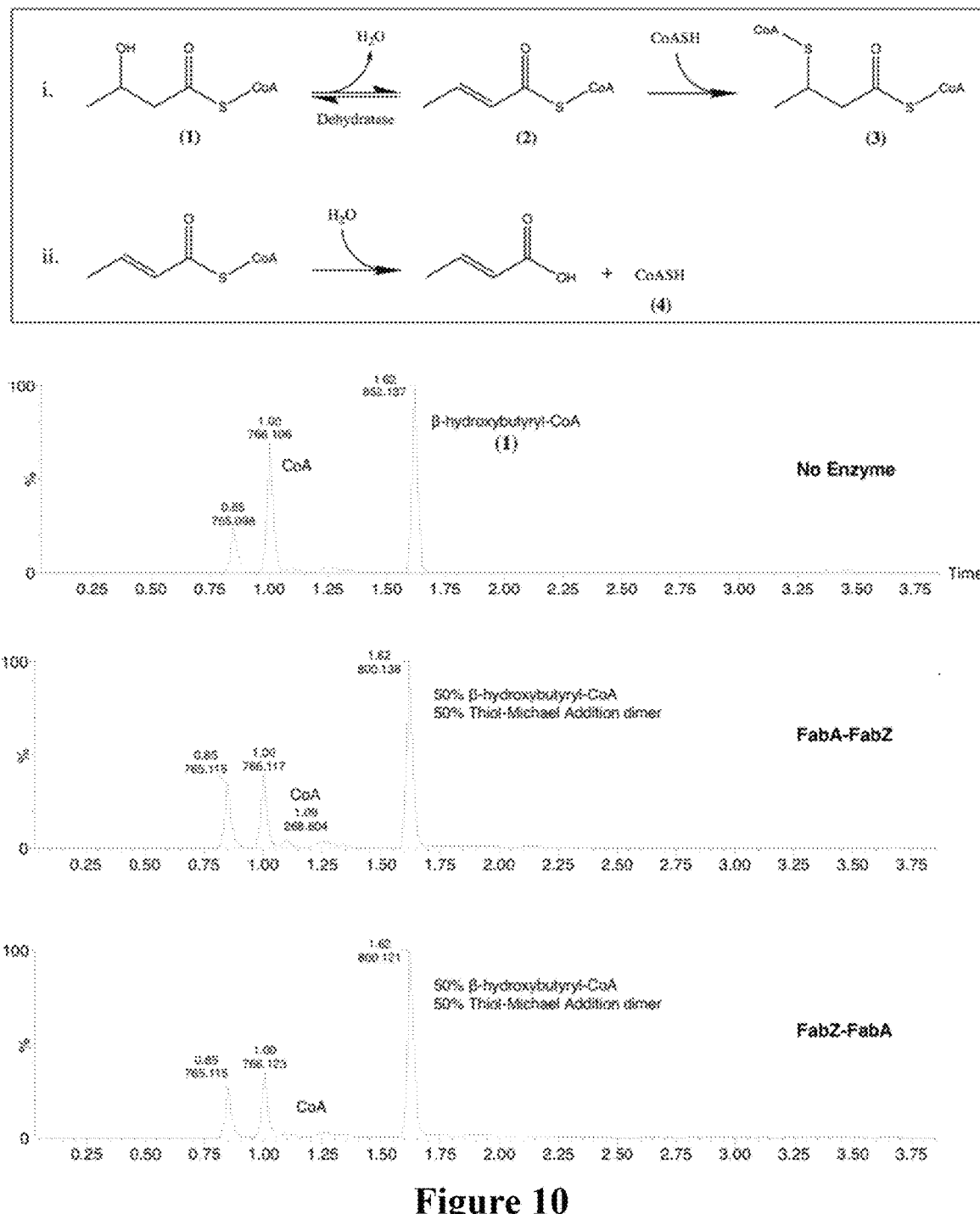

FIG. 10. Enzyme reaction products of β-hydroxybutyryl-CoA. Hydrolyzed CoASH reacts with crotonyl-CoA to form a dimeric Thiol-Michael Addition product (3). Incubation with either FabA-FabZ or FabZ-FabA yielded a product consisting of 50% crotonyl-CoA, detected as the Thiol-Michael Addition product.

Figure 11:
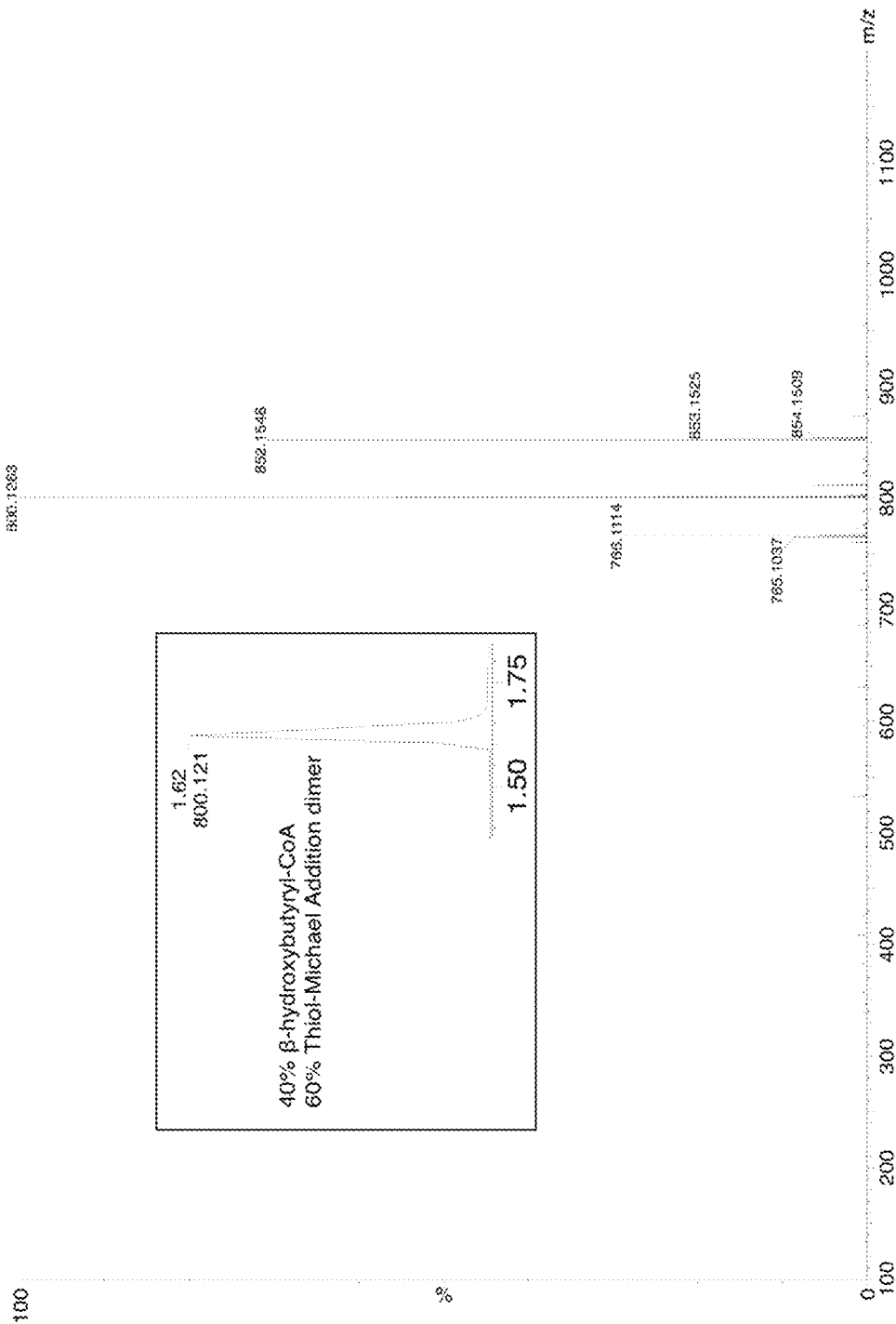

FIG. 11. MS/MS fragmentation of a chromatographic peak at 1.62 minutes detected m/z signals for both p-hydroxybutyryl-CoA (852.154) and the Thiol-Michael Addition product (800.126).

Figure 12:
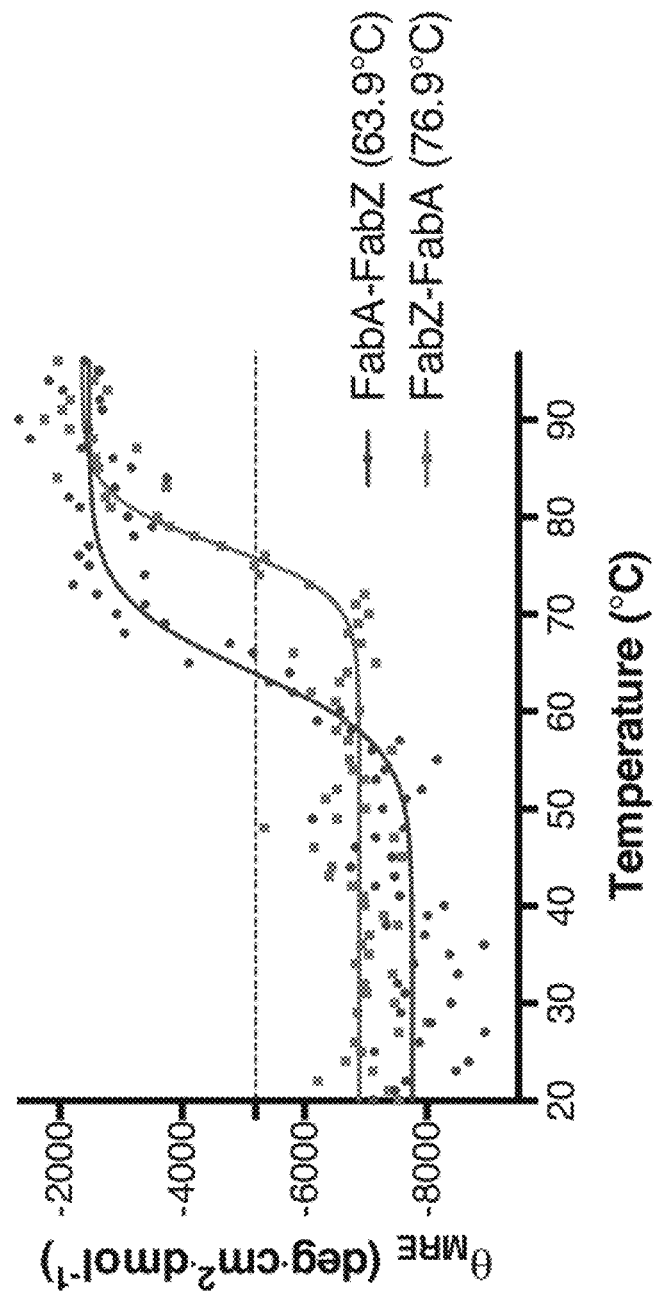

FIG. 12. Thermal stabilities monitored by circular dichroism. The stability of FabZ-FabA is comparable to both FabA and FabA-FabA previously assayed in this work. FabA-FabZ, however, displays a significantly lower Tm of 63.9±0.6° C.

Figure 13:
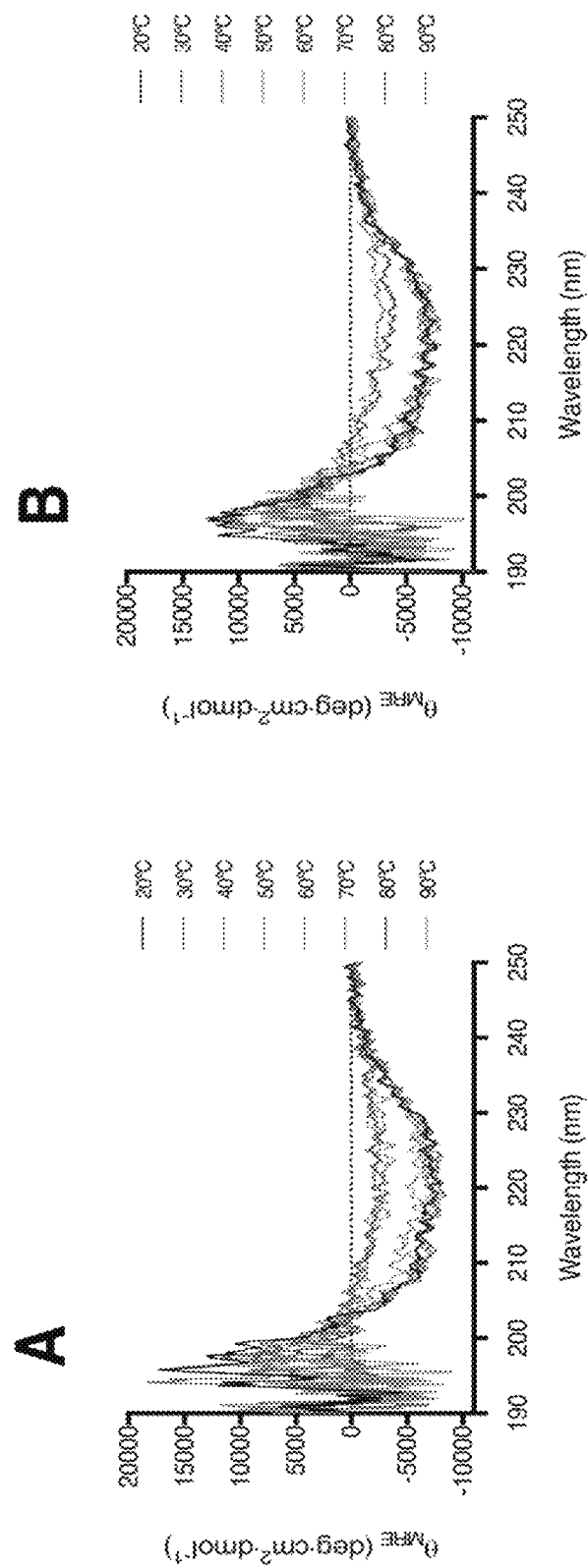

FIG. 13. Far-UV CD scans of thermal unfolding. CD signal was recorded in the 190-250 nm range at different temperatures. FIG. 13 is the heterodimer FabA-FabZ configuration and FIG. 13B is the heterodimer in the FabZ-FabA configuration. The mostly antiparallel β-sheet enzymes retain almost every element of secondary structure as seen in the 208, 218, and 222 nm bands until the transition temperature. The transition to the denatured state for FabA-FabZ begins at approximately 60° C., noticeably less stable than FabA-FabZ.

Figure 14:
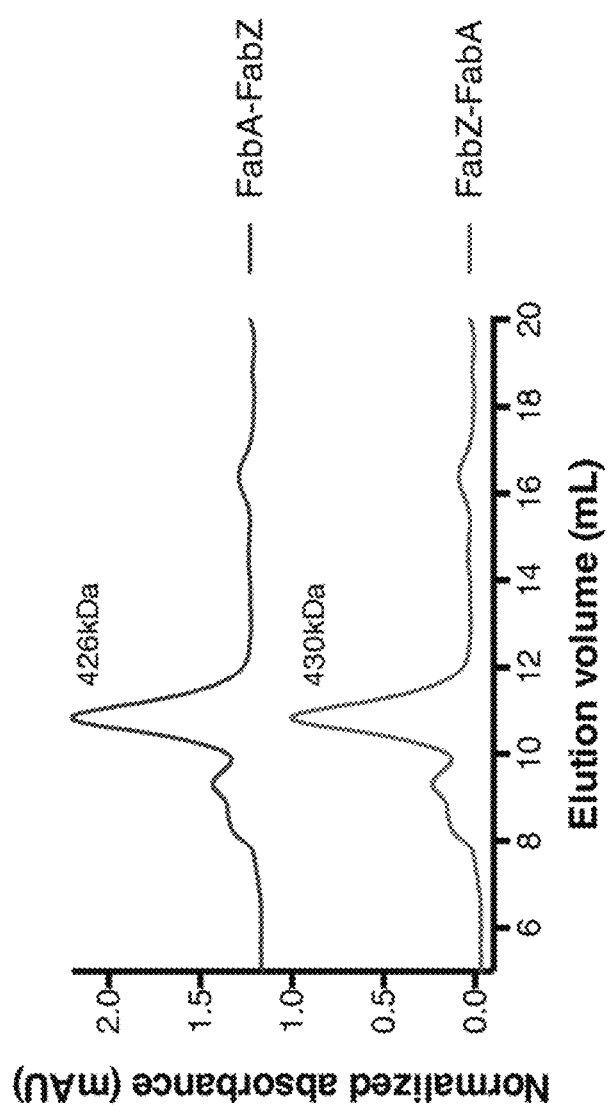

FIG. 14. Determination of oligomeric states by size exclusion chromatography. FabA-FabZ and FabZ-FabA display elution volumes that suggest higher oligomeric states are formed and are possibly decamers in solution with approximate molecular weights of 400 kDa.

Figure 15:
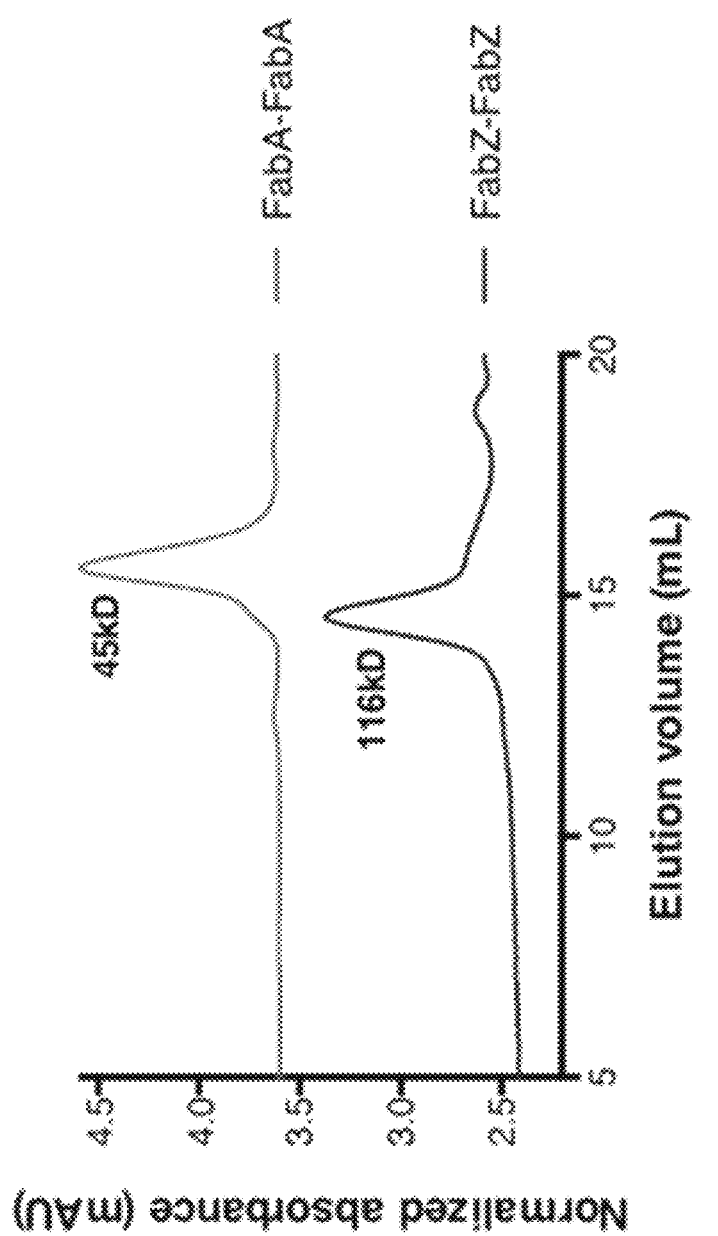

FIG. 15. Determination of oligomeric states by size exclusion chromatography. FabA-FabA elutes at a volume indicative of approximately 46 kDa dimer, whereas FabZ-FabZ elutes as an approximate 116 kDa hexamer, or the expected trimer of dimers that is shown in most crystal structures of FabZ.

Figure 16:
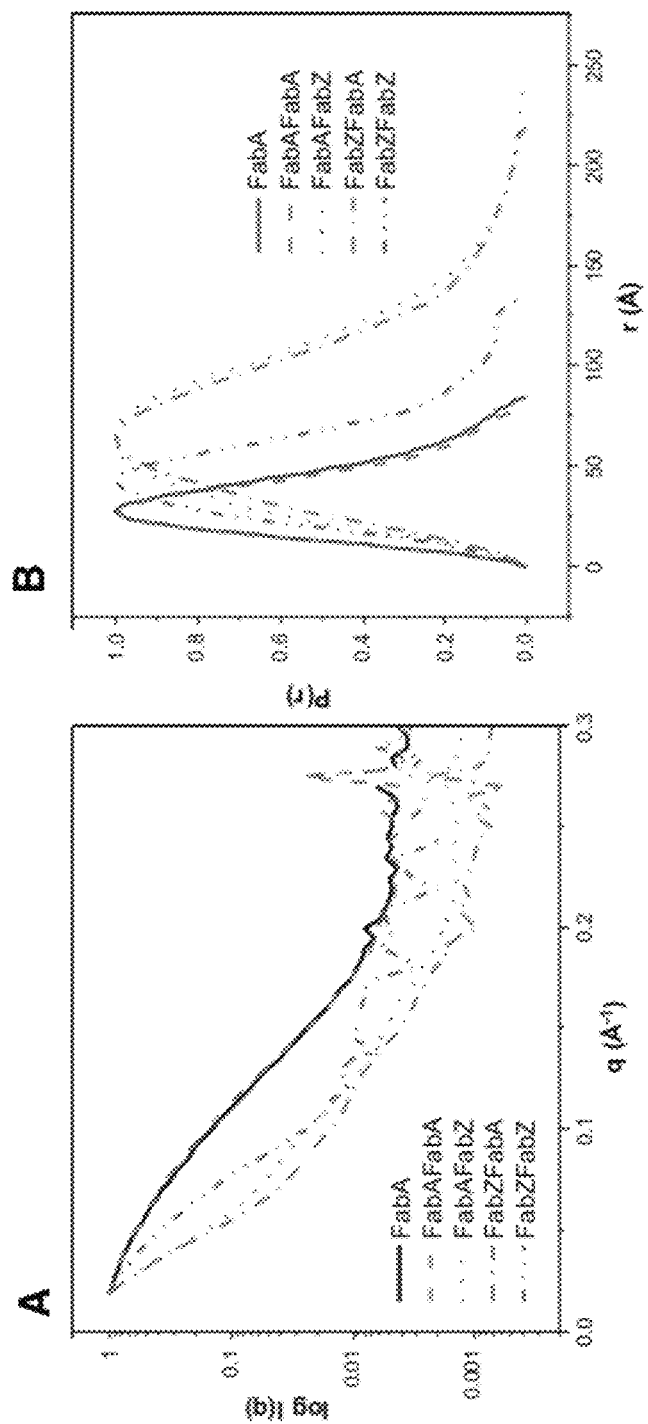

FIG. 16. Small angle x-ray diffraction (SAXS) and wide angle x-ray diffraction (WAXS) scattering and P(r) functions. Scattering curves and P(r) functions of wild-type FabA and fused FabA-FabA and FabZ-FabZ homodimers were included for comparison. FIG. 16A shows SAXS-derived SAXS/WAXS scattering curves and FIG. 16B shows sP(r) functions of fused heterodimers.

Figure 17:
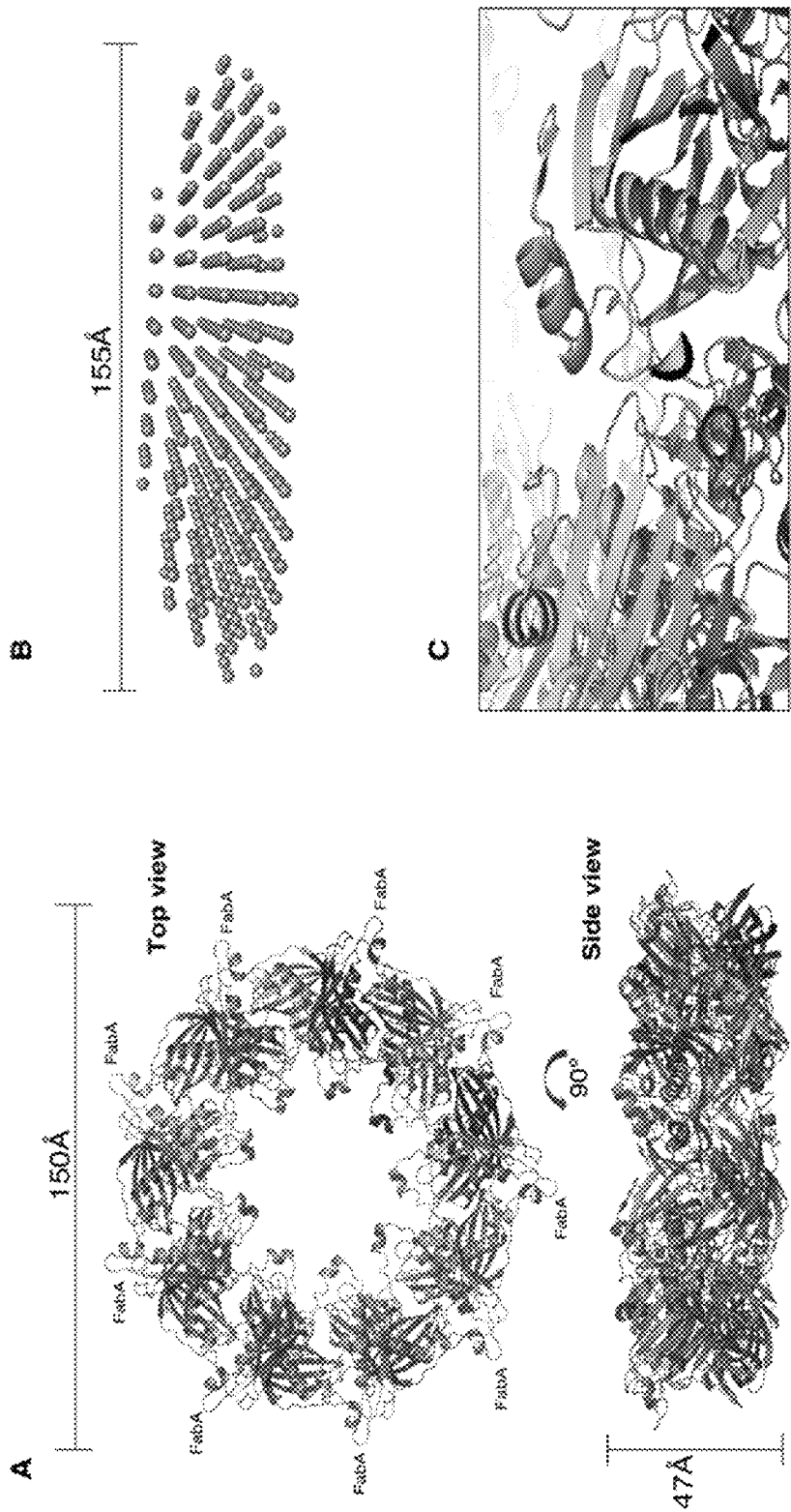

FIG. 17. Solution structures of FabA-FabZ generated by SAXS and computational models. FIG. 17A. Computational predictions of FabA-FabZ oligomerization. FabA-FabZ was assembled into nonamers, and the most plausible model was selected based on agreement with the particle dimensions acquired from the SAXS models, as well as visible evidence of potentially functional interphases between the domains. The model was rotated 900 along its central axis. FIG. 17B. Three-dimensional model generated from the SAXS scattering data.

FIG. 17C. Domain interphases of FabA-FabZ. FabA domains. The presented areas are the regions were identical domains could potentially dimerize into double hot-dog folds.

Figure 18:
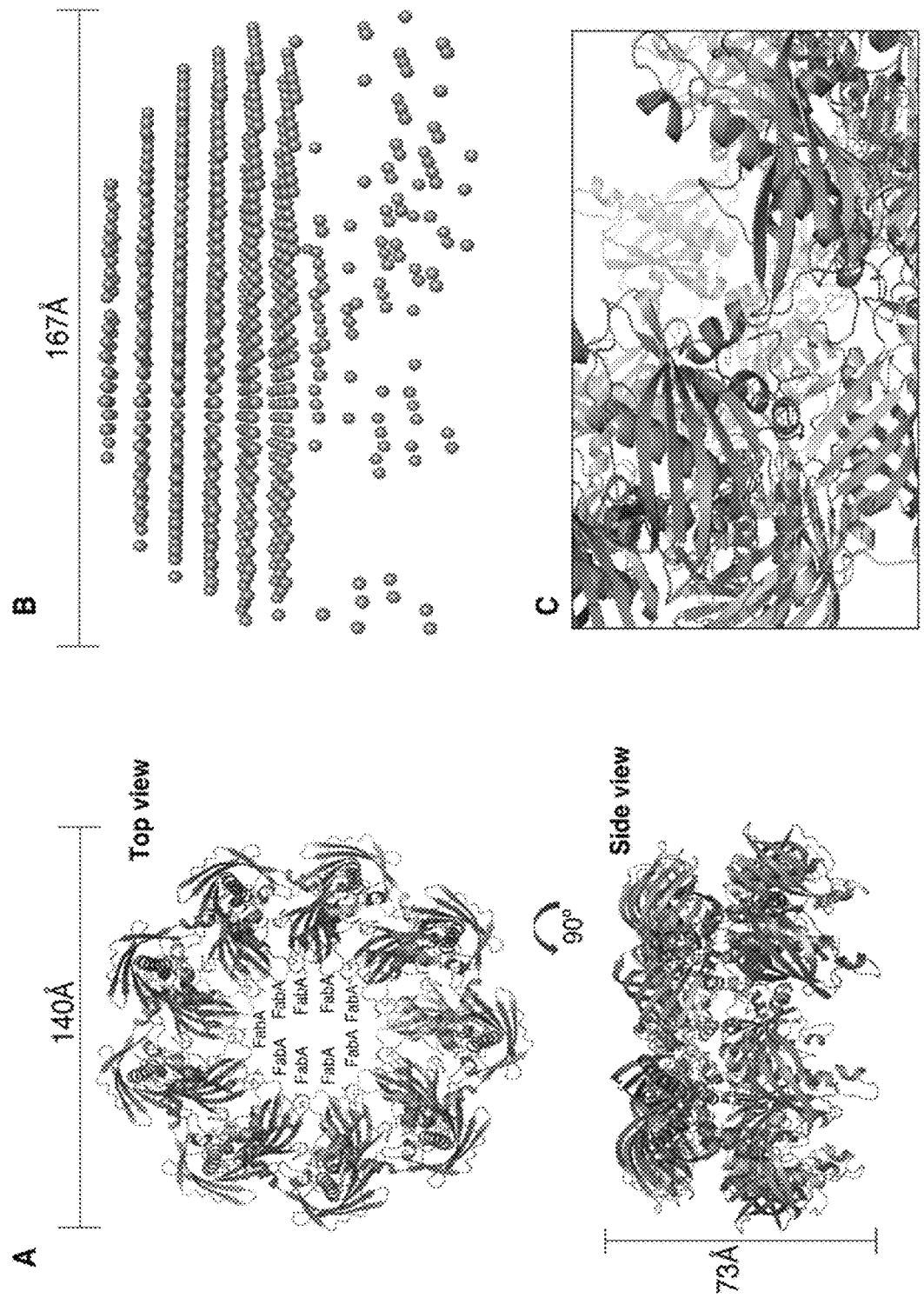

FIG. 18. Solution structures of FabZ-FabA generated by SAXS and computational models. A) Computational predictions of FabZ-FabA oligomerization using the Galaxy-Homomer server. FabZ-FabA was assembled into nonamers, and the most plausible model was selected based on agreement with the particle dimensions acquired from the SAXS models, as well as visible evidence of potentially functional interphases between the domains. Each repetitive unit is represented by a different color and the model was rotated 90° along its central axis. B) Three-dimensional model generated from the SAXS scattering data. C) Domain interphases of FabZ-FabA. FabA domains are highlighted in salmon, FabZ in green, and the linker regions in cyan. The presented areas are the regions were identical domains could potentially dimerize into double hot-dog folds.

Figure 19:
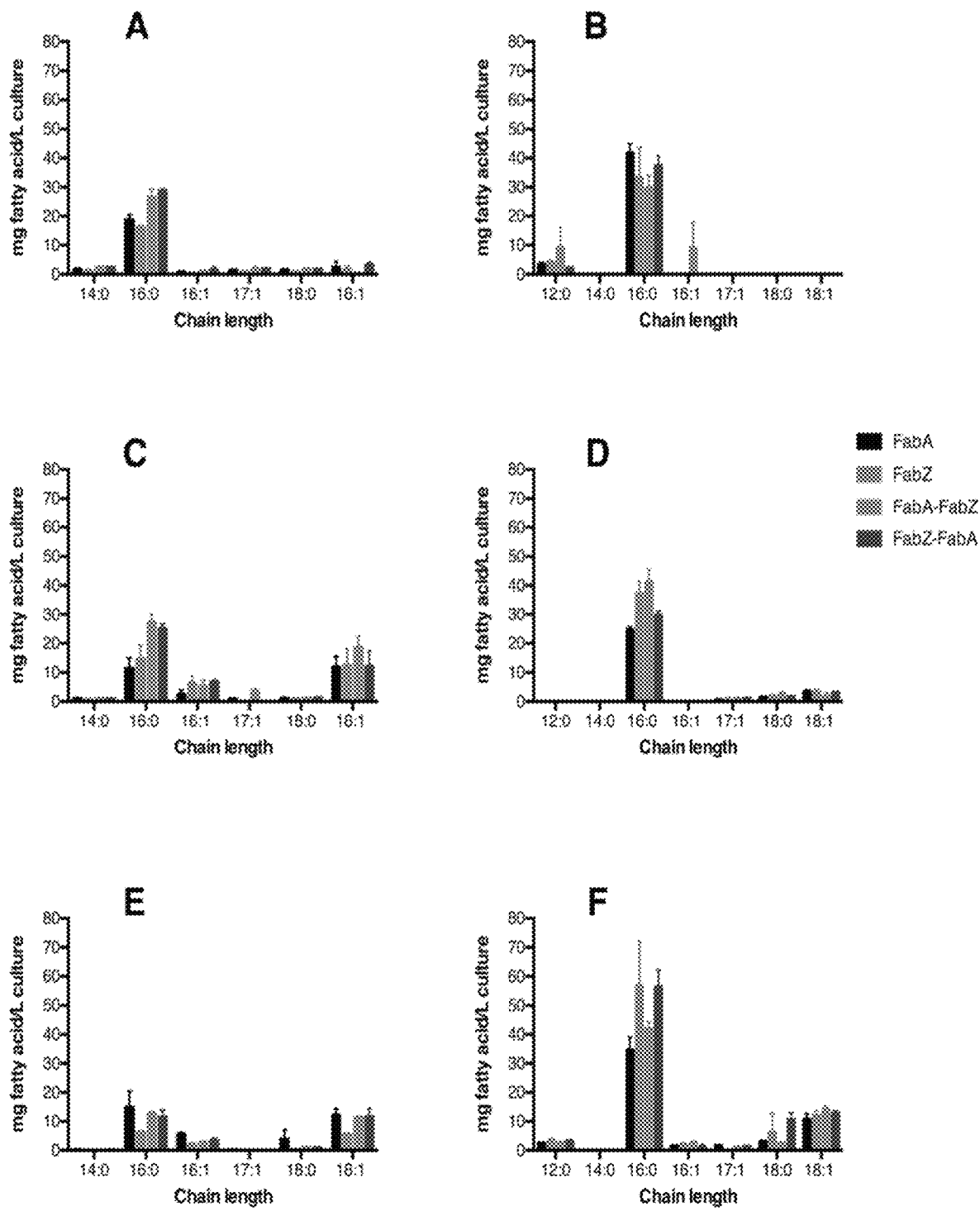

FIG. 19. Fatty acid profiles of *E. coli* cultures harboring FabA-FabZ and FabZ-FabA were compared to the profiles of the parent enzymes at different temperatures by GC/MS. The effect of enzyme overexpression was interrogated by comparing the profiles of cultures induced with 1 mM IPTG to cultures that were uninduced. A) 37° C. 1 mM IPTG, B) 37° C. no IPTG, C) 22° C. 1 mM IPTG, D) 22° C. no IPTG, E) 15° C. 1 mM IPTG, F) 15° C. no IPTG. The error bars represent the SEM of two or three replicate samples.

Figure 20:
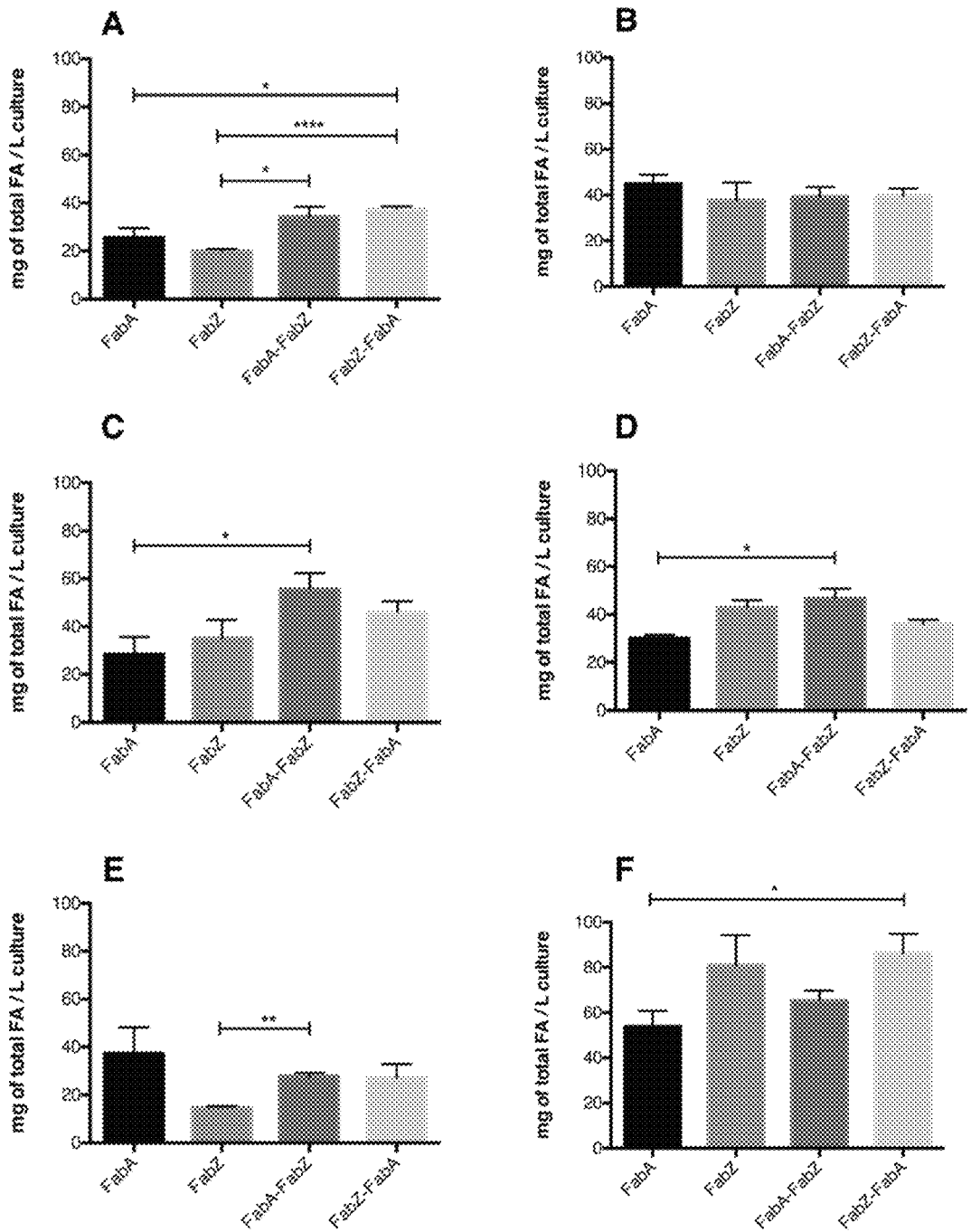

FIG. 20. Total fatty acid production of *E. coli* cultures harboring Fab heterodimers. The individual fatty acids were pooled to determine the overall fatty acid yields. Panels in FIG. 20 represent the following conditions: A) 37° C. 1 mM IPTG; B) 37° C. no IPTG; C) 22° C. 1 mM IPTG; D) 22° C. no IPTG; E) 15° C. 1 mM IPTG, F) 15° C. no IPTG. The error bars represent the SEM of biological triplicates.

Figure 21:
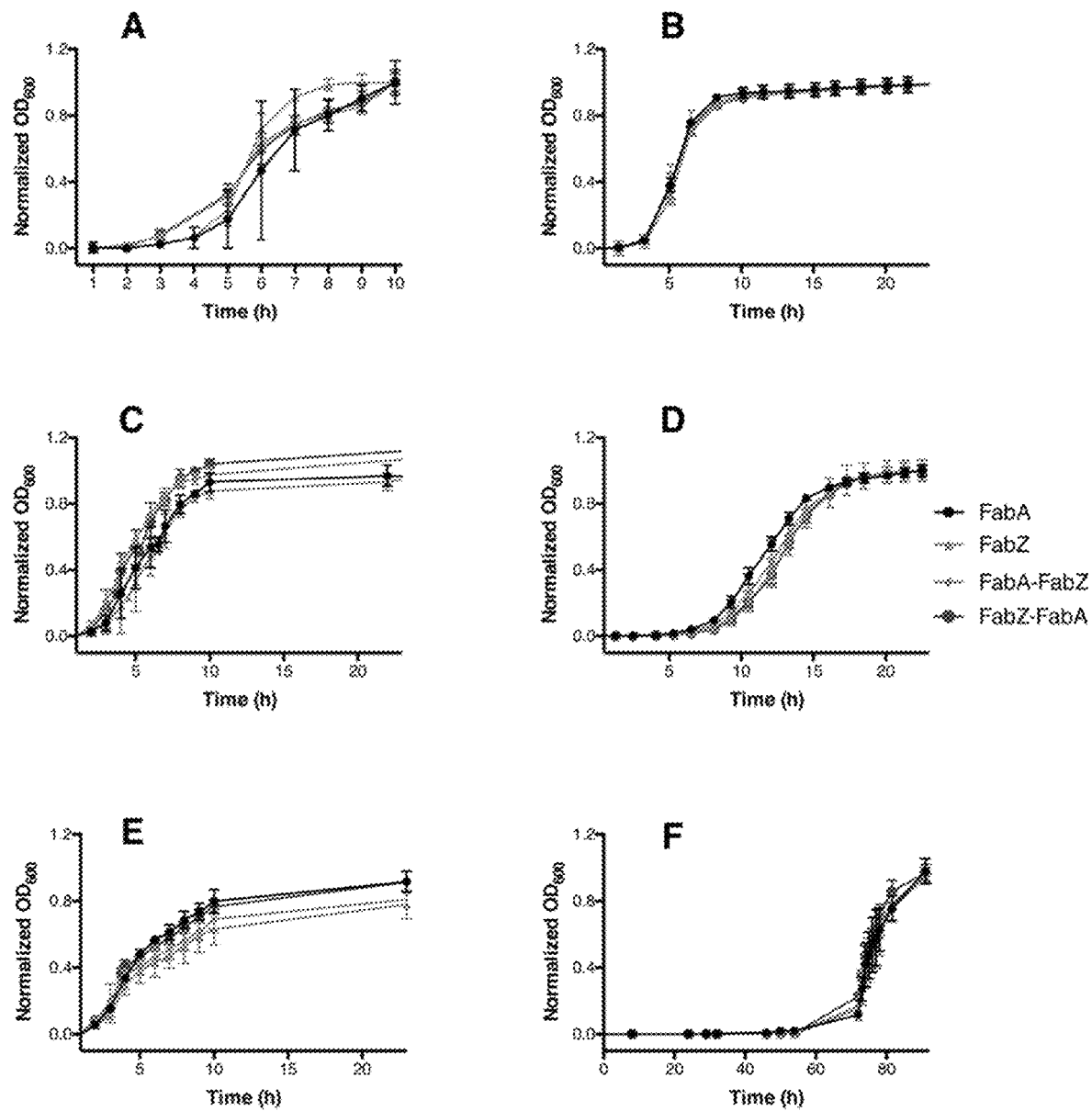

FIG. 21. Growth curves of *E. coli* cultures harboring Fab heterodimers. Panels in FIG. 20 represent A) 37° C. 1 mM IPTG, B) 37° C. no IPTG, C) 22° C. 1 mM IPTG, D) 22° C. no IPTG, E) 15° C. 1 mM IPTG, F) 15° C. no IPTG. Error bars represent the SEM of biological triplicates. As expected, growth was slower at the colder temperatures. Neither FabA-FabZ nor FabZ-FabA affected growth rates. For convenience, the induced samples grown at 22° C. and 15° C. were grown at 37° C. until OD600 reached 0.2-0.3, at which point the temperature was lowered.

Figure 22:
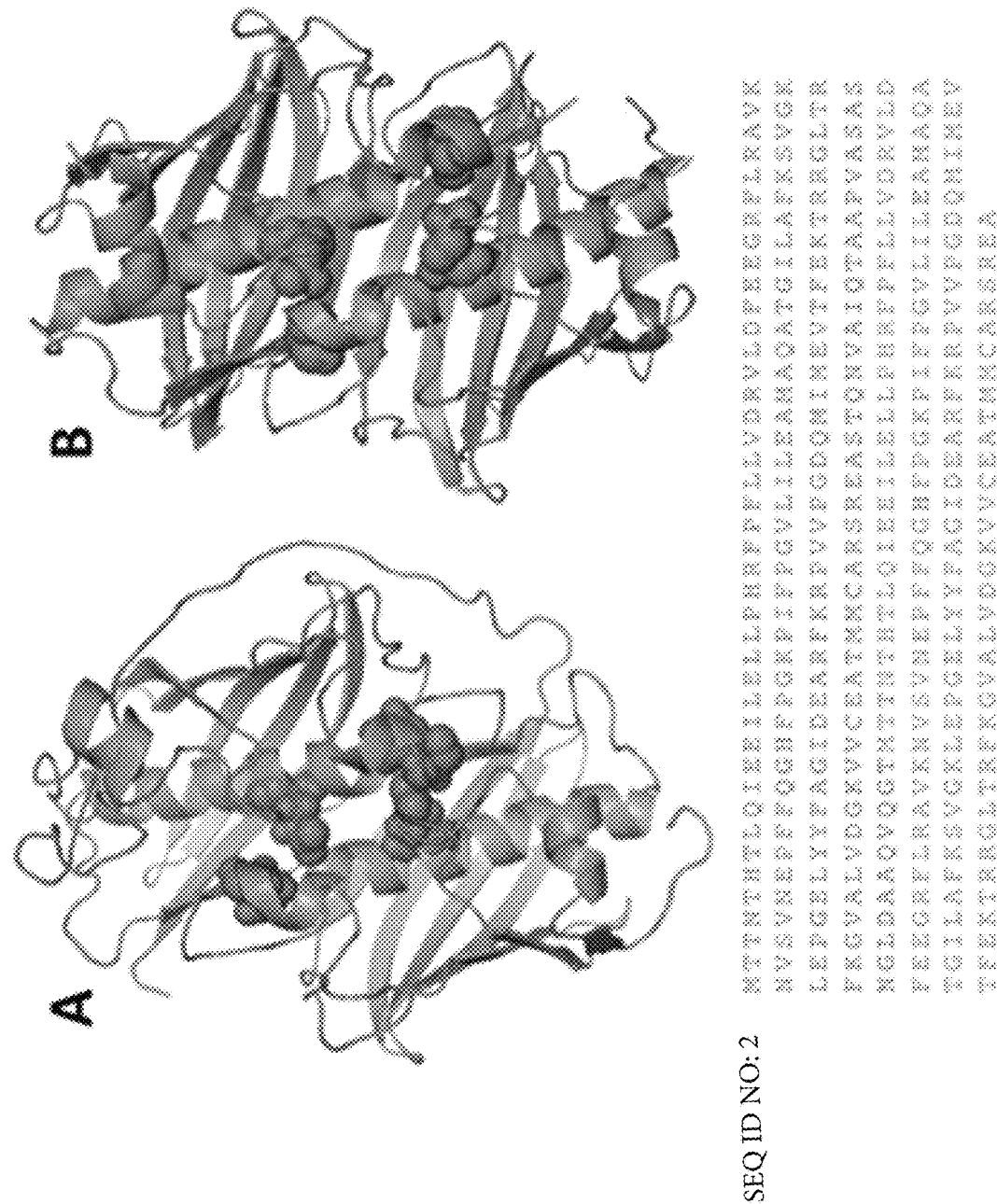

FIG. 22. Three-dimensional model of FabZ-FabZ. Panel A shows a three-dimensional model was built for FabZ-FabZ using the I-Tasser platform and visualized using PyMol. The native dimer of FabZ from *Pseudomonas aeruginosa* is shown in Panel B.

DETAILED DESCRIPTION

Unless defined otherwise, all technical and scientific terms used herein have the same meaning as is commonly understood by one of ordinary skill in the art. The following references provide one of skill with a general definition of many of the terms used in this disclosure: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). These references are intended to be exemplary and illustrative and not limiting as to the source of information known to the worker of ordinary skill in this art. As used herein, the following terms have the meanings ascribed to them below, unless specified otherwise.

It is noted here that as used in this specification and the appended claims, the singular forms "a," "an," and "the" also include plural reference, unless the context clarity dictates otherwise.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z."

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

As utilized in accordance with the present disclosure, the following terms, unless otherwise indicated, shall be understood to have the following meanings. Unless otherwise required by context, singular terms shall include pluralities and plural terms shall include the singular.

A "heterodimer enzyme construct" or "heterodimer protein" means a macromolecular complex formed by two protein monomers. The monomers are covalently or non-covalently bound. A protein heterodimer is macromolecular complex formed by at least two different proteins, along with any additional linkers or supporting proteins.

A "homodimer enzyme construct" or "homodimer protein" means a macromolecular complex formed by two protein monomers. The monomers are covalently or non-covalently bound. A protein homodimer is macromolecular complex formed by at least two proteins of the same subunit, along with any additional linkers or supporting proteins.

A "forced heterodimer" or "fused heterodimer" means a heterodimer formed when two independent protein units are linked together, in the presence of absence of a linker protein. The protein units can be covalently or non-covalently linked.

Fatty Acid (FA) biosynthesis is a ubiquitous pathway in almost all prokaryotic and eukaryotic organisms. FA biosynthesis in bacterial and microbial cultures provides a unique solution to sustainable generation of biofuels and biomaterials as well as human nutrition. Although FA biosynthesis can be carried out in a wide range of organisms, *E. coli* offers advantages of low environmental impact, short production times, and ease of genetic manipulation.

*E. Coli* FA biosynthesis takes place through action of a dissociated system in which several different enzymes catalyze a series of chemical steps for the condensation of acyl units. Each protein is encoded by a separate gene and as such, in *E. coli*, the Fab enzymes, as well as ACP, are separate domains that act as independent entities. While *E. coli* is the preferred microorganism for FA biosynthesis, one skilled in the art will understand that the dissociated system is common among other bacteria, plants, and algae, such as, but not limited to *Yarrowia* Lipolitica (a yeast), *Synechococcus elongatus* (a cyanobacteria) and Thraustochytrids (marine protists). (Ohlrogge, J. B. & Jaworski, J. G. Regulation of fatty acid synthesis. *Annu. Rev. Plant Physiol. Plant Mol. Biol.* 48, 109-136 (1997); Rock, C. O. & Jackowski, S. Forty years of bacterial fatty acid synthesis. *Biochem. Biophys. Res. Commun.* 292, 1155-1166 (2002). As such, one skilled in the art will understand that the biosynthesis of FA described can also be achieved in a wide range of additional microorganisms, including but not limited to other bacteria, plants, and algae. One of skill in the art will know this further includes, but is not limited to, *Yarrowia* Lipolitica (a yeast), *Synechococcus elongatus* (a cyanobacteria) and Thraustochytrids (marine protists).

Each FA elongation cycle consists of four reactions required to extend the length of the acyl chain by two carbons (FIG. 1). Initiation of FA synthesis requires the carboxylation of acetyl-CoA to produce malonyl-CoA.

To begin the cycle, malonyl-ACP is condensed with an acetyl-CoA by a Claisen condensation catalyzed by FabH to generate β-ketobutyryl-ACP. A key intermediate step is the removal of a hydroxyl group from the β-hydroxybutyryl-ACP intermediate by the activity of FabA beta-hydroxyacyl-acyl carrier protein dehydratase subunit (FabA) or FabZ beta-hydroxyacyl-acyl carrier protein dehydratase subunit (FabZ) to form a 2,3-trans double bond (FIG. 2).

The choice of FabA or FabZ depends on the length of the acyl chain and on the transcriptional regulation of the fab gene cluster. FabA possesses both dehydratase and isomerase activities with activity highest towards medium-length acyl chains and lowest towards short and long chain substrates. More specifically, FabA exhibits dehydratase and isomerase activities only for acyl chains that are 10-carbons long Heath, R. J. & Rock, C. O. Roles of the FabA and FabZ β-hydroxyacyl-acyl carrier protein dehydratases in *Escherichia coli* fatty acid biosynthesis. *J. Biol. Chem.* 271, 27795-27801 (1996). FabZ, on the other hand, lacks isomerase activity, will dehydrate intermediates of varying lengths but is most active towards short and long chain substrates, and is able to dehydrate acyl chains that already have a double bond (Heath and Rock, 1996).

Although naturally occurring FabA and FabZ function as obligate dimers (FIG. 3) homodimers connected by a peptide linker and a heterodimer with or without a peptide linker connection provide enhanced physiological benefits versus a homodimer or single FabA or FabZ subunit. The peptide linker is not entirely required for activity. However, the presence of the linker between the subunits enhances solubility and activity of the homodimers and the heterodimers.

The current disclosure describes the forced fusion of identical copies of FabA or FabZ subunits using a stretch of amino acids of polyunsaturated fatty acid (PUFA) synthase from *Photobacterium profundum* as the linker. The resultant homodimers display increased solubility and enhanced protein production and recovery compared to FabA or FabZ.

In addition, there is currently no evidence that FabA and FabZ heterodimers exist in nature. Thus, the current disclosure further describes FabA-FabZ heterodimers fused by PUFA synthase from *Photobacterium profundum* as the linker.

Thus, in one embodiment the disclosure describes a heterodimer protein, comprising a FabA beta-hydroxyacyl-acyl carrier protein dehydratase subunit (FabA), a FabZ beta-hydroxyacyl-acyl carrier protein dehydratase subunit (FabZ) and a peptide linker.

In one aspect the FabA and FabZ heterodimer are fused via a peptide linker to create a fused dimer. The peptide linker can link the two enzyme domains via covalent or non-covalent bonding. In a preferred embodiment, the peptide linker is a polyunsaturated fatty acid synthase (FAS) peptide from *Photobacterium profundum*. The FAS peptide linker can also be derived from organisms, including but not limited a wide range of additional microorganisms, including but not limited to other bacteria, plants, and algae. One of skill in the art will know this further includes, but is not limited to, *Yarrowia* Lipolitica (a yeast), *Synechococcus elongatus* (a cyanobacteria) and Thraustochytrids (marine protists). A preferred peptide linker has a polypeptide sequence according to SEQ ID NO. 15, or a polypeptide with at least 75% identity to SEQ ID NO.15, homologs or functionally conserved variants thereof.

Naturally occurring FabZ and FabA obligate dimers lack a linker and adopt a "hotdog" fold that creates independent active sites that display no cooperativity. One aspect of the current disclosure constitutes a forced heterodimer protein in which the FabA and FabZ subunits are linked via the peptide linker in the FabA-peptide linker-FabZ configuration, wherein the carboxyl terminus of the FabA subunit is covalently linked to the amino terminus of the peptide linker, and the carboxyl terminus of the peptide linker is covalently linked to the amino terminus of the FabZ subunit.

In a second aspect of the current disclosure a forced heterodimer protein in which the FabA and FabZ subunits are linked via the peptide linker in the FabZ-peptide linker-FabA configuration, wherein the carboxyl terminus of the FabZ subunit is covalently linked to the amino terminus of the peptide linker, and the carboxyl terminus of the peptide linker is covalently linked to the amino terminus of the FabA subunit.

Historically, production of fatty acids using *E. coli* has been characterized by low activity that results in low yields. However, as disclosed herein, the forced heterodimer protein of the FabA-peptide linker-FabZ or FabZ-peptide linker-FabA configuration enhanced activity of FabZ compared to a FabZ-FabZ homodimer. In additional embodiments the FabA-peptide linker-FabZ or FabZ-peptide linker-FabA configuration enhances the activity of FabZ activity of FabA compared to a FabA-FabA homodimer.

In addition to the enhanced yields, forced heterodimer proteins disclosed herein were more efficient in catalyzing hydration of Crotonyl in the FabA-peptide linker-FabZ or FabZ-peptide linker-FabA configuration compared to unfused FabA or FabZ.

Typically, the β-hydroxybutyryl-CoA to crotonyl-CoA reaction is not detectable because it is not thermodynamically favored. However, because the crotonyl-CoA product reacts further with hydrolyzed CoA, the equilibrium is shifted in the direction of crotonyl-CoA production, thus making the forward reaction detectable by MS methods. Consistent with this the conversion of beta-hydroxybutyryl-CoA to crotonyl-CoA via the heterodimer protein is detectable by mass spectrometry methods. In yet another aspect, the reaction produces the expected dehydratase compounds. More specifically mass spectrometry detected expected molar mass shifts consistent with the FabA and FabZ catalyzation of a dehydration reaction of β-hydroxybutyryl-CoA to form crotonyl-CoA by as well as the hydration of crotonyl-CoA to form beta-hydroxybutyryl-CoA. In addition, the thiol-michael addition product, which is formed when a free CoA attacks the double bond of a crotonyl-CoA, was also detected via mass spectrometry methods. In a further aspect the conversion of β-hydroxybutyryl-CoA to crotonyl-CoA was also achieved in the presence of both enzymes.

Use of *E. coli* for FA synthesis in the fields of biofuels, agriculture, and human nutrition is advantageous and currently only limited by the rate of FA production in the microorganism. Thus, in one aspect the forced heterodimer enzymes in the FabZ-peptide linker-FabA and FabA-peptide linker-FabZ configuration have enhanced in vitro fatty acid production when compared to the FabA or FabZ parent enzymes. In another aspect, the fused heterodimer enzyme dimers enhance in vitro fatty acid production when compared to the FabZ-FabZ or FabA-FabA homodimers.

In a preferred embodiment, insertion of fused heterodimer protein dimers into *E. coli* cultures increased in vivo fatty acid production when compared to FabA and FabZ parent enzymes. In one aspect, overexpression of FabA-peptide linker-FabZ and FabZ-peptide linker-FabA enhanced total fatty acid yields compared to FabA and FabZ parent enzymes. In another embodiment, overexpression of FabA-peptide linker-FabZ and FabZ-peptide linker-FabA enhanced total fatty acid yields compared to naturally occurring FabA-FabA and FabZ-FabZ obligate homodimers.

In addition to forced heterodimers, another preferred embodiment is a fused homodimer protein, comprising FabA beta-hydroxyacyl-acyl carrier protein dehydratase subunit (FabA) or FabZ beta-hydroxyacyl-acyl carrier protein dehydratase subunit (FabZ) fused by a peptide linker. In one aspect the two copies of FabA are fused by the peptide linker. In a second aspect two copies of FabZ are fused by the peptide linker.

The structure of the forced homodimers is unique compared to naturally occurring homodimers, in part because of the presence of a peptide linker between the two individual subunits. In one aspect the peptide linker is a polyunsaturated fatty acid synthase peptide from *Photobacterium profundum*. In a preferred aspect the peptide linker has polypeptide sequence according to SEQ ID NO. 15 or a polypeptide with at least 75% identity to SEQ ID NO. 15 or homologs or functionally conserved variants thereof. In yet another aspect, the peptide linker can be derived from a variety of micro-organisms including other bacteria, plants, and algae such as, but not limited to *Yarrowia* Lipolitica (a yeast), *Synechococcus elongatus* (a cyanobacteria) and Thraustochytrids (marine protists).

Importantly, the FabA-peptide linker-FabA or FabZ-peptide linker-FabZ configuration impart unique properties to the *E. coli* related to FA synthesis. In a preferred embodiment the fused FabA-peptide linker-FabA forced homodimer expressed in *E. coli* enhances protein production compared to a parent FabA molecule expressed in *E. coli*. In one aspect the Fab Z-peptide linker-FabZ forced homodimer also enhances protein production compared to a parent FabZ molecule expressed in *E. coli*. In yet another aspect, the FabA-peptide linker-FabA forced homodimer expression in *E. coli* enhances protein production versus the naturally occurring FabA-FabA homodimer. In still another aspect, the FabZ-peptide linker-FabZ forced homodimer expression in *E. coli* enhances protein production versus the naturally occurring FabZ-FabZ homodimer.

Further, a preferred aspect of the fused homodimers is that the construct has minimal impact on solubility of the protein. Accordingly, in one aspect, the FabZ-peptide linker-FabZ fused homodimer has enhanced solubility compared to a parent FabZ molecule. In a further aspect, the FabA-peptide linker-FabA forced homodimer has minimal change in solubility compared to the parent FabA molecule.

FabA and FabZ act on β-hydroxy intermediates to form the conjugated double bond in the acyl intermediate. FabZ is advantageous as it will dehydrate intermediates of varying lengths. The activity of the enzymes is related to their ability to hydrate crotonyl-CoA, as this family of dehydratases favors the reverse reaction. Thus, in a preferred embodiment the ability of the fused FabZ-peptide linker-FabZ to hydrate crotonyl-CoA is increased compared to a FabZ native dimer.

Current research supports that the FabA-FabZ heterodimer is a non-naturally occurring protein. The current disclosure provides methods for making a fused heterodimer. In the preferred method a FabA beta-hydroxyacyl-acyl carrier protein dehydratase subunit (FabA), a FabZ beta-hydroxyacyl-acyl carrier protein dehydratase subunit (FabZ), and a peptide linker, comprise the steps of
a) amplifying the FabA gene, the FabZ gene, and a peptide linker gene;
b) performing sequential PCR reactions to generate heterodimers;
c) adding primers at the beginning of PCR reaction IV;
d) cloning a construct into expression vectors;
e) transforming the expression vectors into a cell and
f) verifying the sequence of the construct.

One skilled in the art will recognize that the steps above can be modified to produce the same result and the sequence provided is not the only method of producing the described heterodimer.

In a preferred aspect of the method construction of the disclosure, the forced dimer requires that the FabA or FabZ gene is amplified using a reverse primer that contains an overhang complementary to the 5' terminus of the peptide linker gene. In a related aspect the FabA or FabZ gene is amplified using a forward primer containing an additional sequence complementary to the 3' terminus of the peptide linker gene.

Amplification is followed by purification of the PCR reactions. In the current disclosure the FabA and FabZ genes containing the overhang are purified and the FabA or FabZ gene with the overhang is fused to the peptide linker to generate afab-linker intermediate.

In the preferred method, the FabA gene with the overhang complementary to the 5' terminus of the peptide linker gene is fused with the FabZ gene containing the additional sequence complementary to the 3' terminus of the peptide linker gene. In one aspect the fusion is followed by a final PCR reaction is used to generate the full lengthfabA-peptide linker-FabZ construct.

In a preferred method the sequence of the fabA-peptide linker-FabZ construct heterodimer sequence is determined and compared to the expected sequence.

In another preferred embodiment, the fabZ gene with the overhang complementary to the 5' terminus of the peptide linker gene is fused with the fabA gene containing the additional sequence complementary to the 3' terminus of the peptide linker gene. In one aspect a final PCR reaction is performed to generate the full length FabZ-peptide linker-FabA construct.

In the preferred aspect the sequence of the fabZ-peptide linker-FabA construct heterodimer sequence is determined and compared to the expected sequence. One of skill in the art will understand that the molecular sequences of the constructs described can be determined using a wide range of molecular biology techniques, including but not limited to Sanger sequencing and mass spectrometry.

EXAMPLES

The Examples that follow are illustrative of specific embodiments of the disclosure, and various uses thereof. They are set forth for explanatory purposes only and should not be construed as limiting the scope of the disclosure in any way.

Materials Used in Examples

Solutions and equipment used in the following Examples are briefly provided herein.

Amplification of fabA, fabZ, and pfaA and Construction of Fused Dimes were performed using the QIAQuick™ Gel Extraction Kit (Qiagen™), the Thermo Scientific™ Multiple Primer Analyzer tool, found at Thermo Scientific Bio multiple primer, pET-200/TOPO (Invitrogen™), and *E. coli* strain TOP10 (Invitrogen™).

Protein Expression was performed on *E. coli* BL21 (DE3)-Codon Plus RIL cells (Invitrogen™), liquid Luria-Bertani medium supplemented with 0.4% glycerol, 1% glucose, and containing kanamycin (100 mg/L) and chloramphenicol (25 mg/L). Protein expression was induced with 1 mM IPTG and the cells were harvested by centrifugation on a Sorvall Lynx 4000 Centrifuge using a Fiberlite™ F14-14×50 cy Fixed-Angle Rotor (Thermo Scientific™). Lysis buffer was used to resuspend pellets (20 mM Tris, 500 mM NaCl, 1 mM DTT, 20% glycerol, pH 7.8) in the presence of lysozyme (10 mg/ml), DNase (1 mg/ml), 2× protease inhibitor cocktail (Pierce™). Soluble lysates were filtered through a column filled with Ni-Sepharose (Sigma™) that had been equilibrated with buffer+5 mM imidazole and washed twice with the same buffer+10 mM imidazole. His-tagged proteins were eluted in the in the corresponding buffer containing 200 mM imidazole. Purities of elution fractions were analyzed by SDS-PAGE. Protein yields were calculated using Nanodrop™ A280 quantification and dividing total milligrams of protein per volume of culture.

Enzyme activity assays was measured using crotonyl-CoA (Sigma™) as substrate. Enzymatic reactions were followed spectrophotometrically in a 96-well plate format on a Spectramax 190 instrument (Molecular Devices™). Reactions were carried out in a buffer containing 25 mM Tris, 150 mM NaCl, 10% glycerol, pH 7.8, with varying concentrations of crotonyl-CoA in the range of 1-2500 M. Enzyme concentrations were fixed to 1 M. Data analysis was performed with GraphPad™ Prism 6.

Chemical characterization of enzyme reactions involved enzymes that were incubated monitored spectrophotometrically in a buffer containing (25 mM Tris, 150 mM NaCl, 10% glycerol, 2 μM FabA-FabZ or FabZ-FabA, 500 μM substrate, 130 AL reaction volume, pH 7.8). Proteins were precipitated by adding an equal volume of a chloroform:methanol (2:1) mixture, and removed by centrifugation. The organic supernatants were dried under N2 and reconstituted in methanol. LC-MS was performed on an Acquity™ UPLC system coupled to a XEVO G2S QTOF mass spectrometer. Samples were injected into an Acquity UPLC BEH-C18 1.7

µm, 2.1×100 mm column at a temperature of 40° C. and run isocratically. Mobile phase A contained H2O, 0.01% formic acid, and 0.05% NH4OH. Mobile phase B was acetonitrile, with 0.1% formic acid. The data were acquired using the MassLynx™ software V4.1SCN884.

Thermal stability determination utilized NiNTA elution fractions purified by size exclusion chromatography and exchanged into 20 mM NaH2PO4, 50 mM NaCl, pH 7.8. The signal was read in a Jasco 1 mm quartz cuvette on a Jasco™-1500 spectropolarimeter.

Quaternary structures were analyzed using purified proteins infused into a Superdex™ 200 Increase 10/300 GL column (GE Healthcare™) equilibrated in the NiNTA lysis buffers minus glycerol. Each run with the enzymes was preceded by a run with a mixture of standard proteins (GE Healthcare) [aprotinin (6,500 Da), ribonuclease (13,700 Da), ovalbumin (44,000 Da), conalbumin (75,000 Da), aldolase (158,000 Da), ferritin (440,000 Da)] to generate a Kav vs. log MW curve. Elution volumes were determined using the Unicorn software integration function.

Solution structure determination utilized protein exchange into a 20 mM NaH2PO4, 50 mM NaCl, pH 7.8 and concentrated between 1-3 mg/ml. X-ray scattering were conducted at the LiX beamline at the National Synchrotron Light Source II at Brookhaven National Laboratory, Brookhaven, N.Y. Data processing was performed using an automated Python-based package developed at LiX. The resulting data was combined and merged scattering pattern was analyzed using PRIMUS™, DAMMIN, and DAMMIF of the ATSAS software package and the Rg obtained through the indirect transform algorithm in GNOM.

Extraction and modification of fatty acids required cultures grown in triplicate in liquid LB media in the absence and presence of 1 mM IPTG. Dried pellets were dissolved in NaCl, chloroform, MeOH, and vortexed. The organic phase was isolated after centrifugation and concentrated under $N_2$. Finally, the concentrated fatty acids were resuspended in a mixture of chloroform:MeOH (2:1). A chloroform:MeOH mixture was used to convert fatty acids to their respective methyl esters. Methyl heneiocosanoate was added as an internal standard prior to the addition of methanolic HCl. Fatty acids were isolated by extraction with hexane, dried under $N_2$, and resuspended in 200 µL of hexane.

Fatty acid profiling and quantification was performed using a GC/MS-QP2010 (Shimadzu™) with a fused-silica FAMEWAX capillary column (0.25 mm×30 m) (Restek™) Mass Spec data was processed using the GC/MS Solution Postrun Analysis software (Shimadzu™) for metabolite identification using the NIST 2011 spectral mass library. Data was analyze using GraphPad Prism 6.

Example 1. Amplification and Fusion of fabA, fabZ, and pfaA

DNA sequences for *E. coli* fabA and fabZ genes were obtained from NCBI (Accession no. ACB02154.1 and BAA77855.1, respectively). The pfaA gene from *P. profundum* had been previously cloned. (Trujillo, U., et al. A. Solution structure of the tandem acyl carrier protein domains from a polyunsaturated fatty acid synthase reveals beads-on-a-string configuration. *PLoS ONE* 8, e57859 (2013). The linker region corresponded to amino acids 1511-1538 of the pfaA gene from *P. profundum* (Accession No. CAG19871.1). Accession numbers for the *E. coli* fabA and fabZ genes, are provided in Table 1.

TABLE 1

| DNA sequences for *E. coli* fabA and fabZ and amino acid sequences | | | |
|---|---|---|---|
| SEQ ID NO: | Name | | Sequence/Accession No. |
| 1 | FabA-Linker-FabA | | MVDKRESYTKEDLLASGRGELFGAKGPQLPAPNML MMDRVVKMTETGGNFDKGYVEAELDINPDLWFFG CHFIGDPVMPGCLGLDAMWQLVGFYLGWLGGEGK GRALGVGEVKFTGQVLPTAKKVTYRIHFKRIVNRR LIMGLADGEVLVDGRLIYTASDLKVGLFQDTSAFST QNVAIQTAAPVASASNGLDAAQVQGTMVDKRES YTKEDLLASGRGELFGAKGPQLPAPNMLMMDRVV KMTETGGNFDKGYVEAELDINPDLWFFGCHFIGDP VMPGCLGLDAMWQLVGFYLGWLGGEGKGRALGV GEVKFTGQVLPTAKKVTYRIHFKRIVNRRLIMGLAD GEVLVDGRLIYTASDLKVGLFQDTSAF |
| 2 | FabZ-Linker-FabZ | | MTTNTHTLQIEEILELLPHRFPFLLVDRVLDFEEGRF LRAVKNVSVNEPFFQGHFPGKPIFPGVLILEAMAQA TGILAFKSVGKLEPGELYYFAGIDEARFKRPVVPGD QMIMEVTFEKTRRGLTRFKGVALVDGKVVCEATM MCARSREASTQNVAIQTAAPVASASNGLDAAQVQ GTMTTNTHTLQIEEILELLPHRFPFLLVDRVLDFEEG RFLRAVKNVSVNEPFFQGHFPGKPIFPGVLILEAMA QATGILAFKSVGKLEPGELYYFAGIDEARFKRPVVP GDQMIMEVTFEKTRRGLTRFKGVALVDGKVVCEA TMMCARSREA |
| 3 | FabA-Linker-FabZ | | MVDKRESYTKEDLLASGRGELFGAKGPQLPAPNML MMDRVVKMTETGGNFDKGYVEAELDINPDLWFFG CHFIGDPVMPGCLGLDAMWQLVGFYLGWLGGEGK GRALGVGEVKFTGQVLPTAKKVTYRIHFKRIVNRR LIMGLADGEVLVDGRLIYTASDLKVGLFQDTSAFST QNVAIQTAAPVASASNGLDAAQVQGTMTTNTHT LQIEEILELLPHRFPFLLVDRVLDFEEGRFLRAVKNV |

TABLE 1-continued

DNA sequences for *E. coli* fabA and fabZ and amino acid sequences

| SEQ ID NO: | Name | Sequence/Accession No. |
|---|---|---|
| | | SVNEPFFQGHFPGKPIFPGVLILEAMAQATGILAFKS VGKLEPGELYYFAGIDEARFKRPVVPGDQMIMEVT FEKTRRGLTRFKGVALVDGKVVCEATMMCARSRE A |
| 4 | FabZ-Linker-FabA | MTTNTHTLQIEEILELLPHRFPFLLVDRVLDFEEGRF LRAVKNVSVNEPFFQGHFPGKPIFPGVLILEAMAQA TGILAFKSVGKLEPGELYYFAGIDEARFKRPVVPGD QMIMEVTFEKTRRGLTRFKGVALVDGKVVCEATM MCARSREASTQNVAIQTAAPVASASNGLDAAQVQ GTMVDKRESYTKEDLLASGRGELFGAKGPQLPAPN MLMMDRVVKMTETGGNFDKGYVEAELDINPDLW FFGCHFIGDPVMPGCLGLDAMWQLVGFYLGWLGG EGKGRALGVGEVKFTGQVLPTAKKVTYRIHFKRIV NRRLIMGLADGEVLVDGRLIYTASDLKVGLFQDTS A |

The primers for the amplification of fabA and fabZ contained overhangs of additional sequence that are complementary to either the 5' or 3' terminus of the linker sequence (Table 2). The reverse primers for the amplification of fabAZ contained overhangs complementary the 5' terminus of the linker sequence, whereas forward primers contained overhangs complementary to the 3' terminus of the linker sequence. All primers were purchased from the RCMI Core Lab at UPR Medical Sciences Campus after verification of secondary structure and primer dimer formation using the online Thermo Scientific™ Multiple Primer Analyzer tool.

TABLE 2

Primers used for the formation of *fabA-fabZ*, *fabZ-fabA* heterodimers, and *pfaA* linker.

| SEQ ID NO: | Primer Name | Sequence |
|---|---|---|
| 5 | fabA Fwd TOPO | CACCATGGTAGATAAACGCGAATC |
| 6 | fabA Rv + Overhang | ACATTTTGTGTAGAGAAGGCGACGTATCCTG |
| 7 | fabA Fwd + Overhang | AAGTTCAAGGCACAATGGTAGATAAACGCGA ATC |
| 8 | fabA Rv + Stop | TTAGAAGGCAGACGTATCCTG |
| 9 | fabZ Fwd TOPO | CACCATGACTACTAACACTCATACTCTGCA |
| 10 | fabZ Rv + Overhang | TACATTTTGTGTAGAGGCCTCCCGGCTACG |
| 11 | fabZ Fwd + Overhang | ACAAGTTCAAGGCACAATGACTACTAACACTC TACTCTGCA |
| 12 | fabA Rv + Stop | TTAGGCCTCCCGGCTACGA |
| 13 | pfaA Fwd | TCTACACAAAATGTAGCGATTC |
| 14 | pfaA Rev | TGTGCCTTGAACTTGTGCTG |

Construction of Fused Dimers

A general scheme for the generation of fused heterodimers by overlap PCF is presented in FIG. 4. All PCR reactions were performed using PfuUltra II Fusion HS DNA Polymerase (Agilent™). All PCR reactions were preceded by a denaturation step at 95° C. for two minutes and finished with a final extension step at 68° C. for 3 minutes. For the amplification of the DNA corresponding to the linker region of pfaA, 100 ng of plasmid DNA containing the ACP domains from *P. profundum* were mixed with primers of SEQ ID NOs. 13 and 14. DNA was denatured at 95° C. for 1 minute, followed by annealing at 45.8° C. for 1 minute and finished with an extension 68° C. for 1 minute. For the amplification of fabA, approximately 2 ng of genomic DNA from DH10B *E. coli* cells were mixed with primers of SEQ ID NOs: 5 and 8. For the amplification of fabZ, approximately 2 ng of genomic DNA were mixed with primers of SEQ ID NOs: 9 and 12. For the construction of fused dimers, a number of sequential PCR reactions were performed as provided in Table 3.

TABLE 3

Parameters and instructions for the construction of fabA-fabZ and fabZ-fabA.

| Product | Reaction I | | | Reaction II | | | Reaction III | | | Reaction IV | | |
|---|---|---|---|---|---|---|---|---|---|---|---|---|
| fabA-fabZ | Template(s) | Fwd. | Rv. | Template (s) | Fwd. | Rv. | Template (s) | Fwd. | Rv. | Template (s) | Fwd. | Rv. |
| | DH10B genomic | 1 | 2 | DH10B genomic | 7 | 8 | Rxn I + linker | 1 | 10 | Rxn II + Rxn III | 1 | 8 |
| | PCR Parameters | | | PCR Parameters | | | PCR Parameters | | | PCR Parameters | | |
| | Step | °C. | Time | Step | °C. | Time | Step | °C. | Time | Step | °C. | Time |
| | Denaturation | 95.0 | 2:00 | Denaturation | 95.0 | 2:00 | Denaturation | 95.0 | 0:30 | Denaturation | 95.0 | 0:30 |
| | Annealing | 46.3 | 1:00 | Annealing | 30.5 | 1:00 | Annealing | 31.8 | 0:30 | Annealing | 36.0 | 0:30 |
| | Extension | 68.0 | 1:00 | Extension | 68.0 | 1:00 | Extension | 68.0 | 0:30 | Extension | 68.0 | 0:30 |
| fabZ-fabA | Template(s) | Fwd. | Rv. | Template (s) | Fwd. | Rv. | Template (s) | Fwd. | Rv. | Template (s) | Fwd. | Rv. |
| | DH10B genomic | 5 | 6 | DH10B genomic | 3 | 4 | Rxn I + linker | 5 | 10 | Rxn II + Rxn III | 5 | 4 |
| | PCR Parameters | | | PCR Parameters | | | PCR Parameters | | | PCR Parameters | | |
| | Step | °C. | Time | Step | °C. | Time | Step | °C. | Time | Step | °C. | Time |
| | Denaturation | 95.0 | 2:00 | Denaturation | 95.0 | 2:00 | Denaturation | 95.0 | 0:30 | Denaturation | 95.0 | 0:30 |
| | Annealing | 30.5 | 1:00 | Annealing | 46.3 | 1:00 | Annealing | 33.7 | 0:30 | Annealing | 36.0 | 0:30 |
| | Extension | 68.0 | 1:00 | Extension | 68.0 | 1:00 | Extension | 68.0 | 0:30 | Extension | 68.0 | 0:30 |

The final PCR reactions were completed for 30 cycles with primers. Individual PCR reaction products were separated by electrophoresis on an agarose gel (2%) and purified using the QIAQuick™ Gel Extraction Kit (Qiagen™). The pfaA linker adds 84 base pairs to each construct amino acid sequence corresponding to the 84 base pairs is provided in Table 4. All PCR reaction were preceded by a denaturation step at 95° C. for two minutes and finished with a final extension step at 68° C. for 3 minutes.

Example 2. Expression and Purification

E. coli BL21 (DE3)-Codon Plus RIL cells (Invitrogen™) were transformed with each plasmid and grown in liquid Luria-Bertani medium supplemented with 0.4% glycerol, 1% glucose, and contained kanamycin (100 mg/L) and chloramphenicol (25 mg/L). Cultures were grown at 37° C., 250 rpm until OD600=0.2.-0.3, at which point the temperature was lowered to 22° C. Protein expression was induced with 1 mM IPTG once the OD600 reached 0.5-0.6. After 5 h, the cells were harvested by centrifugation at 4° C. and

TABLE 4

Amino Acid sequence of residues of the pfaA linker gene from P. profundum

| | | |
|---|---|---|
| 15 | Multi-Domain PUFA synthase of P. profundum | STQNVAIQTAAPVASASNGLDAAQVQGT |
| 16 | Fab A of E. coli | MVDKRESYTKEDLLASGRGELFGAKGPQLPAPNM LMMDRVVKMTETGGNFDKGYVEAELDINPDLWFF GCHFIGDPVMPGCLGLDAMWQLVGFYLGWLGGE GKGRALGVGEVKFTGQVLPTAKKVTYRIHFKRIVN RRLIMGLADGEVLVDGRLIYTASDLKVGLFQDTSA F |
| 17 | FabZ of E. coli | MTTNTHTLQIEEILELLPHRFPFLLVDRVLDFEEGRF LRAVKNVSVNEPFFQGHFPGKPIFPGVLILEAMAQA TGILAFKSVGKLEPGELYYFAGIDEARFKRPVVPGD QMIMEVTFEKTRRGLTRFKGVALVDGKVVCEATM MCARSREA |
| 18 | E. coli fabA DNA Sequence | ACB02154.1 |
| 19 | E. coli fabA DNA Sequence | BAA77855.1 |

All constructs were cloned into pET-200/TOPO (Invitrogen), transformed into E. coli strain TOP10 (Invitrogen), and their sequences were fully verified using the Sanger method.

11000×g on a Sorvall Lynx 4000 Centrifuge using a Fiberlite™ F14-14×50 cy Fixed-Angle Rotor (Thermo Scientific™). Samples were stored at −20° C. overnight. Pellets were resuspended in lysis buffer (20 mM Tris, 500 mM NaCl, 1 mM DTT, 20% glycerol, pH 7.8) in the presence of lysozyme (10 mg/ml), DNase (1 mg/ml), 2× protease inhibitor cocktail (Pierce™) and sonicated. The lysates were collected by centrifugation (11000×g, 4° C., 30 min). The soluble lysates were poured through a column filled with Ni-Sepharose (Sigma™) that had been equilibrated with the corresponding buffer+5 mM imidazole and washed twice with the same buffer+10 mM imidazole. His-tagged proteins were eluted in the in the corresponding buffer containing 200 mM imidazole. Purities of elution fractions were analyzed by SDS-PAGE. Protein yields were calculated using Nanodrop™ A280 quantification and dividing total milligrams of protein per volume of culture.

Results

The designed constructs were cloned into pET-200/D-TOPO (FIG. 5), and their protein products were expressed in *E. coli* cultures at 22° C. as evidenced by SDS-PAGE analysis. Purification using NiNTA affinity chromatography resulted in >95% pure elution fractions with protein yields of 4.61, and 5.42 for FabA-FabZ, and FabZ-FabA, respectively (FIG. 6).

The purification of homodimers revealed overall protein yields for FabA and the fused FabAFabA of 40 mg and 52 mg/L of culture, respectively. The yield for FabZ was substantially lower since the protein was highly (although not entirely) insoluble (FIG. 7A). From the soluble lysis supernatant, a total of 0.5 mg FabZ was obtained per liter of culture. Interestingly, the fused dimer FabZ-FabZ was recovered in the soluble lysis supernatant in higher yields than the parent FabZ molecule at 2.8 mg/L of culture, indicating that dimer fusion promotes enzyme solubility [FIG. 7B].

Example 3: Enzyme Activity Assays

The activity for all enzymes was measured in the reverse direction by incubation with crotonyl-CoA (Sigma™) as substrate. This reverse reaction format has been employed previously by others because the equilibrium point of the reaction favors enoyl hydration (Heath & Rock 1996; Rodriguez-Guilbe, et al. Structure, activity, and substrate selectivity of the Orf6 thioesterase from *Photobacterium profundum*. J. Biol. Chem. 288, 10841-10848 (2013).

Enzymatic reactions were followed spectrophotometrically by monitoring the absorbance at 270 nm as a function of time in a 96-well plate format on a Spectramax 190 instrument (Molecular Devices). Reactions were carried out in a buffer containing 25 mM Tris, 150 mM NaCl, 10% glycerol, pH 7.8, with varying concentrations of crotonyl-CoA in the range of 1-2500 M. Enzyme concentrations were fixed to 1 µM. All reactions were measured at 37° C. for 10 minutes, with a 1 second shake every 5 seconds. Pre-enzyme data was also collected for 10 minutes. The values for the absorbance slopes were converted to units of µmole of product per minute by using the equation µmoles/min= (slope*L)/(b*ε), where the slope is given by the instrument (mAU/s), b is the path length (0.61 cm), ε is the molar extinction coefficient resulting from the loss of a double bond as defined by the difference in absorbance between crotonyl-CoA and β-hydroxybutyryl-CoA at a particular wavelength (971.4$M^{-1}$ $cm^{-1}$), and L is the reaction volume (150 µL). The data was normalized by dividing initial velocity values by total amount (µg) of enzyme. These values were plotted as a function of substrate concentration to generate Michaelis-Menten saturation curves. Dividing by the $K_m$ values yielded $k_{cat}/K_m$. Data analysis was performed with GraphPad Prism 6 and using the first 5 minutes of the reaction.

Results

The enzymes in this study were assayed for their ability to hydrate crotonyl-CoA (FIG. 8). Compared both to the parent enzymes (FabA and FabZ), as well as the homodimers (FabA-FabA and FabZ-FabZ) presented in previous work from our group[25], the hybrid fused heterodimers, FabA-FabZ and FabZ-FabA, showed even greater catalytic efficiencies than the homodimeric fusions. Both FabA-FabZ ($V_{max}$=21.4 µmol/min; $K_m$=213 µM) and FabZ-FabA ($V_{max}$=16.6 µmol/min; $K_m$=418 µM) showed increased $V_{max}$ values together with a smaller increase in the $K_m$ values. Their catalytic efficiencies were substantially higher than that of the FabZ-FabZ homodimer and the parent FabZ enzyme. The increases in $k_{cat}$ were enough to offset the $K_m$ increases as evidenced by the enhancement in $k_{cat}/K_m$. FabA-FabZ displayed the highest $k_{cat}/K_m$ with a value of 71.47 µ$M^{-1}$ $s^{-1}$, followed by FabZ-FabA with a value of 28.20 µ$M^{-1}$ $s^{-1}$. Compared to FabZ, the catalytic efficiencies correspond to a 32-fold enhancement for FabA-FabZ, and 13-fold for FabZ-FabA. The kinetic parameters are summarized in Table 5.

TABLE 5

Kinetic Parmeters of enzymes for their ability to hydrate crotonyl-CoA

|  | $K_m$ (µM) | $V_{max}$ (µmoles/min*ug$^{-1}$) | $k_{cat}$ (s$^{-1}$) | $k_{cat}/K_m$ (µ$M^{-1}$s$^{-1}$) | Fold-enhancement (relative to FabZ) |
|---|---|---|---|---|---|
| FabA* | — | — | — | — | — |
| FabA-FabA* | — | — | — | — | — |
| FabZ* | 64 | 0.4 | 144 | 2 | — |
| FabZ-FabZ* | 179 | 5 | 3,814 | 21 | 9 |
| FabA-FabZ | 213 | 21 | 15,229 | 71 | 32 |
| FabZ-FabA | 418 | 16 | 11,813 | 28 | 13 |

FabA, FabA-FabA homodimers, FabZ, and FabZ-FabZ homodimers were assayed for their ability to hydrate crotonyl-CoA since it has been shown for this family of dehydratases that equilibrium favors the reverse reaction (FIG. 9). FabA and the fused dimer FabA-FabA showed very little activity toward crotonyl-CoA, a substrate analog, which is substantially shorter than the 10-carbon fatty acid that is the natural substrate for FabA (FIG. 9A). Similarly, the activity of FabZ toward crotonyl-CoA was modest (kcat5144 s21; Km564 mM). The FabZ-FabZ fused dimer showed a significant increase in activity as compared to the FabZ native dimer with an ninefold enhancement in catalytic efficiency with a $k_{cat}$=3814 $s^{-1}$ and Km=179.8 µM (FIG. 9B).

Chemical Characterization of Enzyme Reaction Products

Enzymes were incubated overnight at 37° C. with either crotonyl-CoA or (3-hydroxybutyryl-CoA in a 96-well plate and monitored spectrophotometrically (25 mM Tris, 150 mM NaCl, 10% glycerol, 2 µM FabA-FabZ or FabZ-FabA, 500 µM substrate, 130 L reaction volume, pH 7.8). Proteins were precipitated by adding an equal volume of a chloroform: methanol (2:1) mixture, and removed by centrifugation. The organic supernatants were dried under N2 and reconstituted in methanol. LC-MS was performed on an Acquity™ UPLC system coupled to a XEVO G2S QTOF mass spectrometer. The electrospray source was operated in the negative-ion mode. Samples were injected into an Acquity™ UPLC BEH-C18 1.7 µm, 2.1×100 mm column at a temperature of 40° C. and run isocratically. Mobile phase A contained H2O, 0.01% formic acid, and 0.05% NH4OH. Mobile phase B was acetonitrile, with 0.1% formic acid. The data were acquired using the MassLynx™ software V4.1SCN884.

The enzyme-catalyzed dehydration of p-hydroxybutyryl CoA (1) to form crotonyl-CoA (2) was followed by liquid chromatography mass spectrometry (LC/MS) after overnight incubation with either FabA-FabZ or FabZ-FabA (FIG. 10). Both enzymes seemed to produce the same amount of crotonyl-CoA product, which was readily reactive with free CoA via a Thiol-Michael addition to yield a compound whose presence was confirmed by MS/MS fragmentation (3) (FIG. 11).

By contrast, the incubation of crotonyl-CoA with either FabA-FabZ or FabZ-FabA yielded a mixture of 1 (30%) and 3 (70%) (FIG. 12). In all, these LC/MS results confirm the formation of the expected products for these dehydratase enzymes, although the crotonyl-CoA was mostly detected as the well documented Thiol-Michael addition product (Nair, D., et al. The Thiol-Michael addition reaction: A powerful and widely used tool in materials chemistry. Chem. Mater. 26, 724-744 (2014)).

Example 4: Thermal Stability Determination by Circular Dichroism

NiNTA elution fractions were purified by size exclusion chromatography and exchanged into 20 mM NaH$_2$PO$_4$, 50 mM NaCl, pH 7.8. All samples came from new aliquots that had not been previously thawed and refrozen. The lack of DTT did not result in any change in elution volumes. SEC elution fractions were diluted to 0.1 mg/mL and placed in a Jasco 1 mm quartz cuvette. No more than 20 minutes elapsed between the moment samples were collected from the SEC column to when they were placed in the CD cuvette, and no further sample preparation was done after the dilution. Thermal denaturation was measured by monitoring the CD signal at 218 nm as a function of temperature in the range of 20-95° C. (1° C./min) in a Jasco-1500 spectropolarimeter using the Interval Temperature Scan Measurement program. The program was set to hold the temperature after every 10° C. and record far-UV CD spectra from 190-250 nm until the final temperature was reached. Precipitation was observed at the end of the run in every sample. Far-UV spectra was reported as an average of three scans.

Parameters for Tm scan were: CD scale 200 mdeg/1.0 dOD, D.I.T 1 s, bandwidth 1 nm. Parameters for CD spectra scans were: CD scale 200 mdeg/1.0 dOD, D.I.T 4 s, bandwidth 1 nm, scan speed 50 nm/min. CD units (mdeg) were converted to $\theta_{MRE}$ units using the equation $\theta_{MRE}$= (deg*MRW)/(10*c*b), where MRW is the mean residue weight (Da), c is the enzyme concentration (g/mL), and b is the cell pathlength (cm). Denaturation analysis was performed using the built-in Thermal Denaturation Analysis Program.

Results

Circular dichroism spectroscopy was used to assess the thermal denaturation of the fused heterodimers by monitoring the loss of the β-sheet content with increasing temperature. Interestingly, the unfolding temperatures were substantially different for both heterodimers, with the more active FabA-FabZ being nearly 14° C. less stable than FabZ-FabA. The heterodimer FabA-FabZ denatured at 63.9±0.6° C. and FabZ-FabA denatured at 76.9±0.5° C. (FIG. 12). All proteins in this study denatured irreversibly since their secondary structures were not recovered when the temperature was restored to 20° C. Far-UV spectra revealed both enzymes have very similar denaturation patterns at different temperatures. The mostly antiparallel β-sheet enzymes retain almost every element of secondary structure as seen in the 208, 218, and 222 nm bands until the transition temperature was reached (FIG. 13).

Example 5: Quaternary Structures of Homodimers and Heterodimers by Size Exclusion Chromatography The purified proteins were infused into a Superdex 200 Increase 10/300 GL column (GE Healthcare™) equilibrated in the NiNTA lysis buffers minus glycerol. Each run with the enzymes was preceded by a run with a mixture of standard proteins (GE Healthcare™) [aprotinin (6,500 Da), ribonuclease (13,700 Da), ovalbumin (44,000 Da), conalbumin (75,000 Da), aldolase (158,000 Da), ferritin (440,000 Da)] to generate a Kav vs. log MW curve, where Kav=(Ve−Vo)/(Vc−Vo), Ve is the elution volume, Vc is the total column volume, and Vo is the column void volume. Enzymes were eluted at a flowrate of 0.8 mL/min, and the elution volumes were determined using the Unicorn software integration function. The resulting standard curve was used to estimate the molecular weight for our proteins.

Results

The quaternary structure for the different fused heterodimers was estimated using size exclusion chromatography on a Superdex 200 column (FIG. 14). According to the elution volumes obtained from the chromatogram, higher order oligomeric states were observed for the hybrid fused constructs FabA-FabZ and FabZ-FabA with retention volumes corresponding to proteins of approximately 400 kDa, while the native FabA elutes at a volume consistent with 37 kDa protein. A protein particle of that size could be either a protein aggregate or a true higher oligomer with intermolecular contact between cognate subunits: FabA subunits binding other FabA subunits and likewise for FabZ subunits, to form a multimeric arrangement. The fact that these large proteins are highly active against crotonyl-CoA is inconsistent with the formation of aggregates, but the formation of higher oligomers in dehydratase enzymes is unprecedented The quaternary structure for the different homodimers was estimated using size exclusion chromatography on a Superdex 200 column, (FIG. 15). The elution volume of FabA-FabA corresponded to that of a protein weighing 45 kDa, which is the theoretical molecular weight for the fused dimer and in agreement with the dimeric nature of wild-type FabA. Eluting at an apparent weight of ~116 kD, FabZFabZ displays a elution volume indicative of a trimer of fused dimers.

Example 6: Solution Structures Using Small Angle X-Ray Scattering (SAXS) and Computational Predictions of Domain Arrangements Proteins were exchanged into 20 mM NaH$_2$PO$_4$, 50 mM NaCl, pH 7.8 and concentrated between 1-3 mg/ml. X-ray scattering were conducted at the LiX beamline at the National Synchrotron Light Source II at Brookhaven National Laboratory, Brookhaven, N.Y. The enzymes and buffer solutions were continuously flowed through a capillary and exposed to the X-ray beam for 5 s. The measurements were carried out in triplicate. Data processing was performed using an automated Python-based package developed at LiX. Overall, the two-dimensional scattering patterns from protein solutions were first converted into one-dimensional scattering profiles. The SAXS/WAXS data were then merged, averaged, and buffer subtracted to obtain relative scattering intensity (I) as a function of the momentum transfer vector, q ($q=(4\pi \sin \theta)/\lambda$), where $\lambda$ is the beam wavelength, and $\theta$ is the scattering angle. The resulting combined and merged scattering pattern was analyzed using PRIMUS, DAMMIN, and DAMMIF of the ATSAS software package (Franke, D., Petoukhov, M., Konarev, P., Panjkovich, A., Tuukkanen, A., Mertens, H., Kikhney, A., Hajizadeh, N., Franklin, J., Jeffries, C. & Svergun, D. ATSAS 2.8: a comprehensive data analysis suite for small-angle scattering from macromolecular solutions. J. *Appl. Crystallogr.* 50, 1212-1225 (2017)) using a resolution range of $q=\{0.01\text{-}0.32$ A$\}$. The Rg value derived from the Guinier analysis (5.060.1 nm) corresponded well to the Rg obtained through the indirect transform algorithm in GNOM.

The amino acid sequences of FabA-FabZ and FabZ-FabA were uploaded into the server and forced to assemble into oligomers harboring between four to ten repetitive units. The most fitting models were chosen based on the docking score provided by the server, agreement with the particle sizes determined by SAXS, and the proximity of domains.

Results

To provide a more definitive picture of the true oligomerization state of the hybrid fused dimers, Small-angle X-ray Scattering (SAXS) was employed. SAXS is typically used to probe aspects of conformation or oligomerization is large proteins. Using this method, we showed that both FabA-FabZ and FabZ-FabA displayed molecular weights higher than what would be expected for the individual monomers, suggesting the formation of higher oligomers. SAXS data confirmed both heterodimers form functional oligomers, and analysis of the Guinier approximations confirm the presence of a monodisperse particle and almost rule out the possibility aggregation (FIG. 16A). The P(r) functions, which represent the probability distributions of FabA-FabZ and FabZ-FabA, were notably different than monomeric and homodimeric FabA previously studied by our group (FIG. 16B). The radii of gyration were determined to be 61.31 Å for FabA-FabZ and 60.65 Å for FabZ-FabA. Indirect Fourier transformation of the SAXS/WAXS data revealed $D_{max}$ values of 242 Å and 220 Å, for FabA-FabZ and FabZ-FabA, respectively. The P(r) function (FIG. 16B) is a distance distribution from where particle dimensions can be extracted. According to this analysis, both heterodimers form large disc-like oligomers, with FabZ-FabA being slightly wider and having an extended lower portion. The dimensions for FabA-FabZ were 155 Å×50 Å (FIG. 17B), and the larger FabZ-FabA was 167 Å×90 Å (FIG. 18B).

Using the GalaxyHomomer server, oligomers containing 4 to 10 repetitive units were interrogated, and possible models for the oligomerization of FabA-FabZ and FabZ-FabA were selected (Baek, M., et al. GalaxyHomomer: a web server for protein homo-oligomer structure prediction from a monomer sequence or structure. *Nucleic Acids Res.* 45, W320-W324 (2017); Ko, J., et al. GalaxyWEB server for protein structure prediction and refinement. *Nucleic Acids Res.* 40, W294-W297 (2012)).

The dimensions obtained from the SAXS data could be plausibly accommodated into nonameric arrangements in such a way that there is possible contact between the domains. Additionally, the molecular weight of a nonamer is similar to the molecular weights determined by SEC. Oligomers containing 8 or 10 units either did not display particle sizes consistent with the SAXS data, or the domains could not be arranged in a physiologically active manner.

Interestingly, in the model selected for FabA-FabZ, the FabA domains face the outer surface of the disc (FIG. 17A), whereas in FabZ-FabA, the FabA domains face the inner surface (FIG. 18A). In these models, identical domains are situated side by side (FabA interfaces with FabA and FabZ interfaces with FabZ) and although there appears to be some distance between them, their dimerization into double hot-dog folds cannot be ruled out (FIGS. 17C and 18C).

Example 7: Extraction and Modification of Fatty Acids for Quantification

Cultures were grown in triplicate in liquid LB media using the same procedure as before at 37° C., 22° C., and 15° C., in the absence and presence of 1 mM IPTG. After a total of 27 h, cells were harvested, frozen at −80° C., and lyophilized. Fatty acids were extracted using the Bligh-Dyer method (Bligh, E. G. & Dyer, W. J. A rapid method of total lipid extraction and purification. *Can. J. Biochem. Physiol.* 37, 911-917 (1959)).

Briefly, dried pellets were dissolved in NaCl, chloroform, MeOH, and vortexed. The organic phase was isolated after centrifugation and concentrated under N2. Finally, the concentrated fatty acids were resuspended in a mixture of chloroform:MeOH (2:1). To convert fatty acids to their respective methyl esters, the extracted fatty acids in the chloroform:MeOH mixture were reacted with methanolic HCl and refluxed for 2 h under constant stirring and heating. Methyl heneicosanoate was added as an internal standard prior to the addition of methanolic HCl. Fatty acids were isolated by extraction with hexane, dried under $N_2$, and resuspended in 200 μL of hexane.

The cultures grown at 37° C. with IPTG induction, made mostly hexadecanoic acid (16:0), with low levels of mono-unsaturated fatty acids. Both FabA-FabZ and FabZ-FabA produced more 16:0 than either FabA or FabZ alone (FIG. 19). The effect of enzyme overexpression was interrogated by comparing the profiles of cultures induced with 1 mM IPTG to cultures that were uninduced at different temperatures: (FIG. 19A) 37° C. 1 mM IPTG; (FIG. 19 B) 37° C. no IPTG; (FIG. 19C) 22° C. 1 mM IPTG; (FIG. 19D) 22° C. no IPTG; (FIG. 19E) 15° C. 1 mM IPTG; (FIG. 19F) 15° C. no IPTG.

In the uninduced cultures, the low levels of unsaturated fatty acids that were observed in the induced samples decreased to undetectable levels, and the profiles shifted towards the production of 16:0 almost exclusively. At 22° C., the IPTG-induced cultures produced a notable amount of octadecenoic acid (18:1), yet 16:0 remained the dominant species which was higher in cells overexpressing FabA-FabZ and FabZ-FabA. However, in the uninduced cultures, there were no significant differences in the production of 16:0. Finally, at 15° C. similar fatty acid profiles were obtained but with even lower overall yields in the presence of IPTG. The uninduced samples cultured at 15° C. produced the highest amounts of 16:0, and both heterodimers had yields higher than FabA, but similar to FabZ. These results are summarized in Table 6. Overall, the induction with IPTG suppressed 16:0 fatty acid production but enhanced monounsaturated fatty acid production.

TABLE 6

Effect of fused heterodimers on in vivo fatty acid profiled.

| | 12:0 | | 14:0 | | 16:0 | | 16:1 | | 17:1 | | 18:0 | | 18:1 | |
|---|---|---|---|---|---|---|---|---|---|---|---|---|---|---|
| | + | − | + | − | + | − | + | − | + | − | + | − | + | − |
| Fatty acid profiles at 37° C. (mg/L) | | | | | | | | | | | | | | |
| FabA | — | 3.38 | 1.81 | — | 18.7 | 41.7 | 0.85 | 33.3 | 1.42 | — | 1.58 | 3.33 | 2.40 | — |
| FabA-FabA | — | 2.72 | 3.17 | — | 20.5 | 32.3 | 1.50 | — | 2.47 | — | 2.58 | — | 3.72 | — |
| FabZ | — | 4.27 | 1.39 | — | 16.1 | 33.5 | 0.65 | — | 0.94 | — | 0.91 | — | 1.65 | — |
| FabZ-FabZ | — | 1.84 | 0.91 | — | 10.6 | 41.0 | 0.38 | — | 0.96 | — | 0.98 | — | — | — |
| FabA-FabZ | — | 9.27 | 2.50 | — | 25.5 | 29.9 | 1.07 | 8.97 | 1.70 | — | 1.92 | — | 0.56 | — |
| FabZ-FabA | — | 2.20 | 2.47 | — | 28.7 | 37.4 | 1.57 | — | 1.96 | — | 1.86 | — | 3.45 | — |
| Fatty acid profiles at 22° C. (mg/L) | | | | | | | | | | | | | | |
| FabA | — | — | 1.02 | — | 11.5 | 24.7 | 2.59 | — | 0.98 | 0.53 | 1.13 | 1.56 | 11.8 | 3.53 |
| FabA-FabA | — | — | 0.57 | — | 12.8 | 27.0 | 6.51 | — | 0.51 | 1.19 | 1.40 | 1.53 | 14.4 | 3.12 |
| FabZ | — | — | 0.73 | — | 14.7 | 37.2 | 6.44 | — | — | 0.55 | 0.90 | 1.98 | 12.5 | 3.37 |
| FabZ-FabZ | — | — | 0.64 | — | 19.2 | 55.4 | 5.88 | — | 0.65 | 0.85 | 1.60 | 3.00 | 17.7 | 2.97 |
| FabA-FabZ | — | — | 1.12 | — | 27.4 | 41.3 | 5.32 | — | 3.66 | 0.97 | 1.29 | 2.77 | 18.6 | 1.87 |
| FabZ-FabA | — | — | 1.04 | — | 25.3 | 29.8 | 6.69 | — | — | 1.23 | 1.36 | 1.76 | 12.2 | 3.26 |
| Fatty acid profiles at 15° C. (mg/L) | | | | | | | | | | | | | | |
| FabA | — | 2.46 | — | — | 15.0 | 34.6 | 5.80 | 1.45 | — | 1.63 | 3.89 | 3.01 | 12.3 | 10.8 |
| FabA-FabA | — | 1.53 | — | — | 8.89 | 34.3 | 3.94 | 1.42 | — | 0.90 | — | 1.49 | 11.4 | 12.7 |
| FabZ | — | 3.56 | — | — | 6.46 | 57.0 | 2.26 | 2.08 | — | — | 0.46 | 6.24 | 5.68 | 12.1 |
| FabZ-FabZ | — | 3.01 | — | — | 12.6 | 51.4 | 1.87 | 3.64 | — | 1.92 | 1.70 | 2.83 | 7.99 | 14.2 |
| FabA-FabZ | — | 2.81 | — | — | 12.8 | 42.0 | 2.93 | 2.73 | — | 0.99 | 1.03 | 2.60 | 11.4 | 14.2 |
| FabZ-FabA | — | 3.29 | — | — | 11.6 | 56.5 | 3.38 | 1.31 | — | 1.45 | 0.89 | 10.8 | 11.7 | 12.9 |

All values reported in Table 6 are units of mg of fatty acid per liter of culture (mg/L) and are the means of either a biological duplicate or triplicate. (+) denotes the cultures induced with 1 mM IPTG, (−) denotes the uninduced cultures. Fused FabA-FabA and FabZ-FabZ homodimers are included for comparison.

The FabA-FabZ and FabZ-FabA heterodimers displayed higher enhancements on total fatty acid production than the fused homodimers (FIG. 20). At 37° C., the enhancements in the induced cultures were 1.7 and 2-fold for FabA-FabZ and FabZ-FabA, respectively, relative to FabZ. Relative to FabA, only FabZ-FabA was enhanced (1.5-fold). No enhancements were observed in the uninduced cultures at 37° C. At 22° C., the overexpression of FabA-FabZ enhanced fatty acid yields 1.9-fold over FabA, and 1.4-fold over FabA in the uninduced cultures. FabZ-FabA did not enhance yields at this temperature. Again, induction with IPTG seems to suppress fatty acid production at 15° C. Yet, even with the low fatty acid production, cells overexpressing FabA-FabZ displayed a 1.9-fold enhancement over FabZ. Also, uninduced cultures harboring FabZ-FabA had 1.6-fold enhancements over FabZ. These results are summarized in Table 7. Growth rates were not altered by either heterodimer (FIG. 21).

TABLE 7

Fatty acids yields of E. Coli cultures harboring fused heterodimers.

| | | | FabA (mg/L) | FabZ (mg/L) | FabA-FabZ (mg/L) | Fold-change over FabA | Fold-change over FabZ | FabZ-FabA (mg/L) | Fold-change over FabA | Fold-change over FabZ |
|---|---|---|---|---|---|---|---|---|---|---|
| 37° C. | + | | 25.5 ± 4.0 | 20.0 ± 0.6 | 34.3 ± 4.1 | — | 1.7 | 37.7 ± 0.9 | 1.5 | 2 |
| | − | | 45.1 ± 3.9 | 37.8 ± 7.6 | 39.2 ± 4.3 | — | — | 39.6 ± 3.2 | — | — |
| 22° C. | + | | 28.7 ± 7.1 | 35.3 ± 7.3 | 55.8 ± 6.4 | 1.9 | — | 46.1 ± 4.3 | — | — |
| | − | | 30.3 ± 1.3 | 43.1 ± 2.9 | 47.0 ± 3.9 | 1.4 | — | 36.0 ± 1.8 | — | — |
| 15° C. | + | | 37.1 ± 10.1 | 14.9 ± 0.3 | 27.8 ± 1.5 | — | 1.9 | 27.3 ± 5.6 | — | — |
| | − | | 53.9 ± 6.8 | 80.9 ± 13.3 | 65.3 ± 4.3 | — | — | 86.2 ± 8.6 | — | 1.6 |

Example 8: Quantification of Fatty Acid Production and Statistical Analysis

Fatty acid profiling was performed using a GC/MS-QP2010 (Shimadzu™) with a fused-silica FAMEWAX capillary column (0.25 mm×30 m) (Restek™). The oven temperature was set to 130° C. for 5 min, followed by a temperature ramp from 130 to 250° C. at 4° C./min, and finally, held at 250° C. for 5 min, using helium as the carrier gas. Mass spectra data were obtained after electron impact ionization at 70 eV. Data was processed using the GC/MS Solution Postrun Analysis software (Shimadzu™) for metabolite identification using the NIST 2011 spectral mass library.

Fatty acid yields were calculated as follows: First, the millimoles of each fatty acid were calculated using the formula mmol $FA=(A_{FA}/A_{IS})*C_{IS}*V_{chl}$, where $(A_{FA}/A_{IS})$ is the ratio of the areas of each fatty acid and the internal standard calculated from the gas chromatogram, $C_{IS}$ is the known concentration of the internal standard (M), and $V_{chl}$ is the volume of chloroform:MeOH used to resuspend the concentrated fatty acids (mL). From here, the milligrams of each fatty acid per liter of culture were calculated as mg $FA/L=(mmol\ FA*g_{cell}*MW)/(g_{ext}*V_{tot})$, where $g_{cell}$ is the total dry cell mass (g), $g_{ext}$ is the dried cell mass used for the extraction (g), $V_{tot}$ is the total culture volume (L), and MW is the molecular weight for each fatty acid (g/mol). Individual fatty acid yields were pooled in order to determine the amount of total fatty acids per liter of culture. Statistical analysis was performed using GraphPad Prism 6. Data are shown as means±SEM and p-values were calculated using the Student's t-test, $p<0.05$.

Example 9: Three-Dimensional Protein Models

Models for FabA-FabA and FabZ-FabZ homodimers were built using the I-TASSER (Iterative Threading ASSEmbly Refinement) server and visualized using PyMol. The I-Tasser server selected the crystal structure of the FabA dehydratase from *E. coli* (PDB ID: 1MKA) as the best template for FabA-FabA and the FabZ dehydratase from *Pseudomonas aeruginosa* (PDB ID: 1U1Z) as the best template for FabZ-FabZ.

The model contains the FabZ repeats, the linker and the active site His and Glu residues. According to this model, an elonongated linker could accomodate a fused dimeric arrangement that is similar to that of the native dimer of FabZ from *Pseudomonas aeruginosa* (FIG. 22). The FabZ-linker-FabZ sequence is shown (SEQ ID NO. 2).

Having described the invention in detail and by reference to specific aspects and/or embodiments thereof, it will be apparent that modifications and variations are possible without departing from the scope of the invention defined in the appended claims. More specifically, although some aspects of the present invention may be identified herein as particularly advantageous, it is contemplated that the present invention is not limited to these particular aspects of the invention. Percentages disclosed herein may vary in amount by ±10, 20, or 30% from values disclosed and remain within the scope of the contemplated invention.

What is claimed is:

1. A heterodimer protein, comprising a FabA beta-hydroxyacyl-acyl carrier protein dehydratase subunit (FabA), a FabZ beta-hydroxyacyl-acyl carrier protein dehydratase subunit (FabZ) and a peptide linker, wherein the FabA and FabZ subunits are covalently or non-covalently linked, wherein the peptide linker comprises SEQ ID NO: 15, or a polypeptide with at least 75% identity to SEQ ID NO: 15.

2. The heterodimer protein of claim 1, wherein the FabA and the FabZ are fused via the peptide linker to create a covalently-linked heterodimer.

3. The heterodimer protein of claim 1, wherein the carboxyl terminus of the FabA subunit is covalently linked to the amino terminus of the peptide linker, and the carboxyl terminus of the peptide linker is covalently linked to the amino terminus of the FabZ subunit.

4. The heterodimer protein of claim 1, wherein the carboxyl terminus of the FabZ subunit is covalently linked to the amino terminus of the peptide linker, and the carboxyl terminus of the peptide linker is covalently linked to the amino terminus of the FabA subunit.

5. The heterodimer protein of claim 1, wherein the heterodimer is configured to form a FabA-peptide linker-FabZ or a FabZ-peptide linker-FabA configuration.

6. The heterodimer protein of claim 5, wherein the FabA-peptide linker-FabZ or FabZ-peptide linker-FabA configuration is a forced heterodimer.

7. A method for producing fatty acids comprising overexpressing a recombinant expression construct in a cell that encodes a FabA-peptide linker-FabZ or FabZ-peptide linker-FabA heterodimeric protein, wherein the peptide linker comprises SEQ ID NO: 15, or a polypeptide with at least 75% identity to SEQ ID NO: 15, wherein total fatty acid yield is increased compared with a cell expressing FabA or FabZ homodimeric proteins.

8. The method of claim 7, wherein the cell is an *E. Coli* cell.

9. A method for making a fused heterodimer protein consisting of a FabA beta-hydroxyacyl-acyl carrier protein dehydratase subunit (FabA) a FabZ beta-hydroxyacyl-acyl carrier protein dehydratase subunit (FabZ) and a peptide linker, wherein the peptide linker comprises SEQ ID NO: 15, or a polypeptide with at least 75% identity to SEQ ID NO: 15, comprising the steps of a) amplifying the FabA gene, the FabZ gene, and a peptide linker gene; b) performing sequential PCR reactions to generate heterodimers; c) adding primers at the beginning of PCR reaction IV; d) cloning a construct into expression vectors; e) transforming the expression vectors into a cell; and f) verifying the sequence of the construct.

10. The method of claim 9, wherein the FabA or FabZ gene is amplified using a reverse primer that contains an overhang complementary to the 5' terminus of the peptide linker gene.

11. The method of claim 9, wherein the FabA or FabZ gene is amplified using a forward primer containing an additional sequence complementary to the 3' terminus of the peptide linker gene.

12. The method of claim 9, wherein the FabA and FabZ genes containing the overhang are purified.

13. The method of claim 12, wherein the purified FabA or FabZ gene with the overhang is fused to the peptide linker to generate a Fab-linker intermediate.

14. The method of claim 12, wherein the FabA gene with the overhang complementary to the 5' terminus of the peptide linker gene is fused with the FabZ gene containing the additional sequence complementary to the 3' terminus of the peptide linker gene.

15. The method of claim 13, wherein a final PCR reaction is used to generate the full length FabA-peptide linker-FabZ construct.

16. The method of claim 15, wherein the heterodimer sequence of the fabA-peptide linker-FabZ construct heterodimer sequence is determined and compared to the expected sequence.

17. The method of claim 9, wherein the fabZ gene with the overhang complementary to the 5' terminus of the pfa linker gene is fused with the fabA gene containing the additional sequence complementary to the 3' terminus of the pfa linker gene and a full length FabZ-peptide linker-FabA construct is generated.

18. The method of claim 9, wherein the cell is *E. Coli*.

* * * * *